US012510718B2

(12) United States Patent
Blackwell, Jr. et al.

(10) Patent No.: US 12,510,718 B2
(45) Date of Patent: Dec. 30, 2025

(54) FIBER OPTIC ASSEMBLY WITH CONNECTORIZED MIDPLANE

(71) Applicant: CORNING RESEARCH & DEVELOPMENT CORPORATION, Corning, NY (US)

(72) Inventors: Chois Alven Blackwell, Jr., North Richland Hills, TX (US); Rolando Herrera Gutierrez, Reynosa (MX); Larry Todd McKinney, Keller, TX (US); Jason Cameron Payne, Fort Worth, TX (US); Fabiola Patricia Villanueva Tavares, Reynosa (MX)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 278 days.

(21) Appl. No.: 18/194,859

(22) Filed: Apr. 3, 2023

(65) Prior Publication Data

US 2023/0236378 A1 Jul. 27, 2023

Related U.S. Application Data

(63) Continuation of application No. PCT/US2021/053287, filed on Oct. 4, 2021.
(Continued)

(51) Int. Cl.
*G02B 6/44* (2006.01)

(52) U.S. Cl.
CPC .......... *G02B 6/4447* (2013.01); *G02B 6/445* (2013.01); *G02B 6/44524* (2023.05);
(Continued)

(58) Field of Classification Search
CPC .. G02B 6/4447; G02B 6/445; G02B 6/44524; G02B 6/44526; G02B 6/44528; G02B 6/4454
See application file for complete search history.

(56) References Cited

U.S. PATENT DOCUMENTS 8,718,436 B2 * 5/2014 Barnes ................. G02B 6/3897
385/136
9,323,020 B2 * 4/2016 Cao ..................... G02B 6/44526
(Continued)

FOREIGN PATENT DOCUMENTS

EP 2639613 A1 * 9/2013 ........... G02B 6/4455

OTHER PUBLICATIONS

"Primex P1000MFSC Service Divider", Retrieved from: https://primex.com/products/p1000mfsc-service-divider/; 2020, 8 pages.
(Continued)

*Primary Examiner* — Ryan A Lepisto
(74) *Attorney, Agent, or Firm* — Kapil U. Banakar

(57) ABSTRACT

A fiber optic assembly is provided including a base configured to be mounted to a surface, a sidewall extending from the base, a cover configured to engage the sidewall to enclose a portion of the fiber optic assembly, a midplane separating a first portion of the fiber optic assembly from a second portion of the fiber optic assembly, and a hinge disposed between the midplane and the sidewall, which enables the midplane to transition between an open position and a closed position. The midplane includes a plurality of adapters disposed through the midplane from a first side to a second side and a plurality of splice holders disposed on the second side configured to retain at least one fiber optic splice connection between an optical fiber of an input cable and an adapter of the plurality of adapters.

20 Claims, 21 Drawing Sheets

Related U.S. Application Data

(60) Provisional application No. 63/091,375, filed on Oct. 14, 2020.

(52) U.S. Cl.
CPC ..... *G02B 6/44526* (2023.05); *G02B 6/44528* (2023.05); *G02B 6/4454* (2013.01)

(56) References Cited

U.S. PATENT DOCUMENTS

| | | | |
|---|---|---|---|
| 11,513,304 B2* | 11/2022 | Hill | G02B 6/445 |
| 2008/0279521 A1 | 11/2008 | Kowalczyk et al. | |
| 2009/0324187 A1* | 12/2009 | Wakileh | G02B 6/44526 385/135 |
| 2010/0027952 A1* | 2/2010 | Ruiz | G02B 6/44524 385/135 |
| 2010/0290753 A1 | 11/2010 | Tang et al. | |
| 2012/0051707 A1 | 3/2012 | Barnes et al. | |
| 2020/0036175 A1 | 1/2020 | Chen et al. | |

OTHER PUBLICATIONS

"Streetsmart Small Count Fiber Hand-Off Box", Intallation Manual; Clearfield; Aug. 2020, 19 Pages.

International Search Report and Written Opinion of the International Searching Authority; PCT/US2021/053287; dated Jan. 22, 2022; 11 pages; European Patent Office.

* cited by examiner

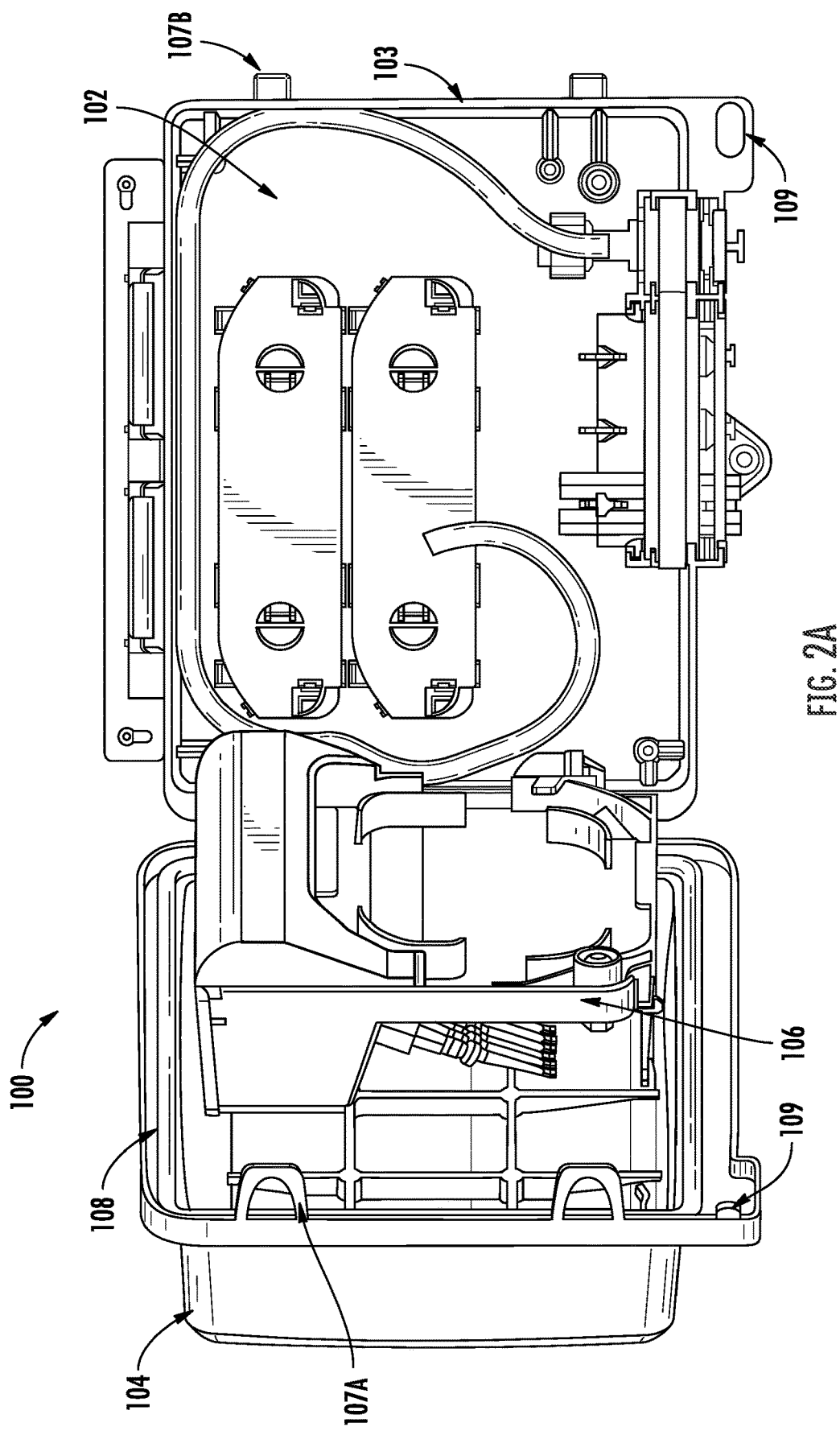

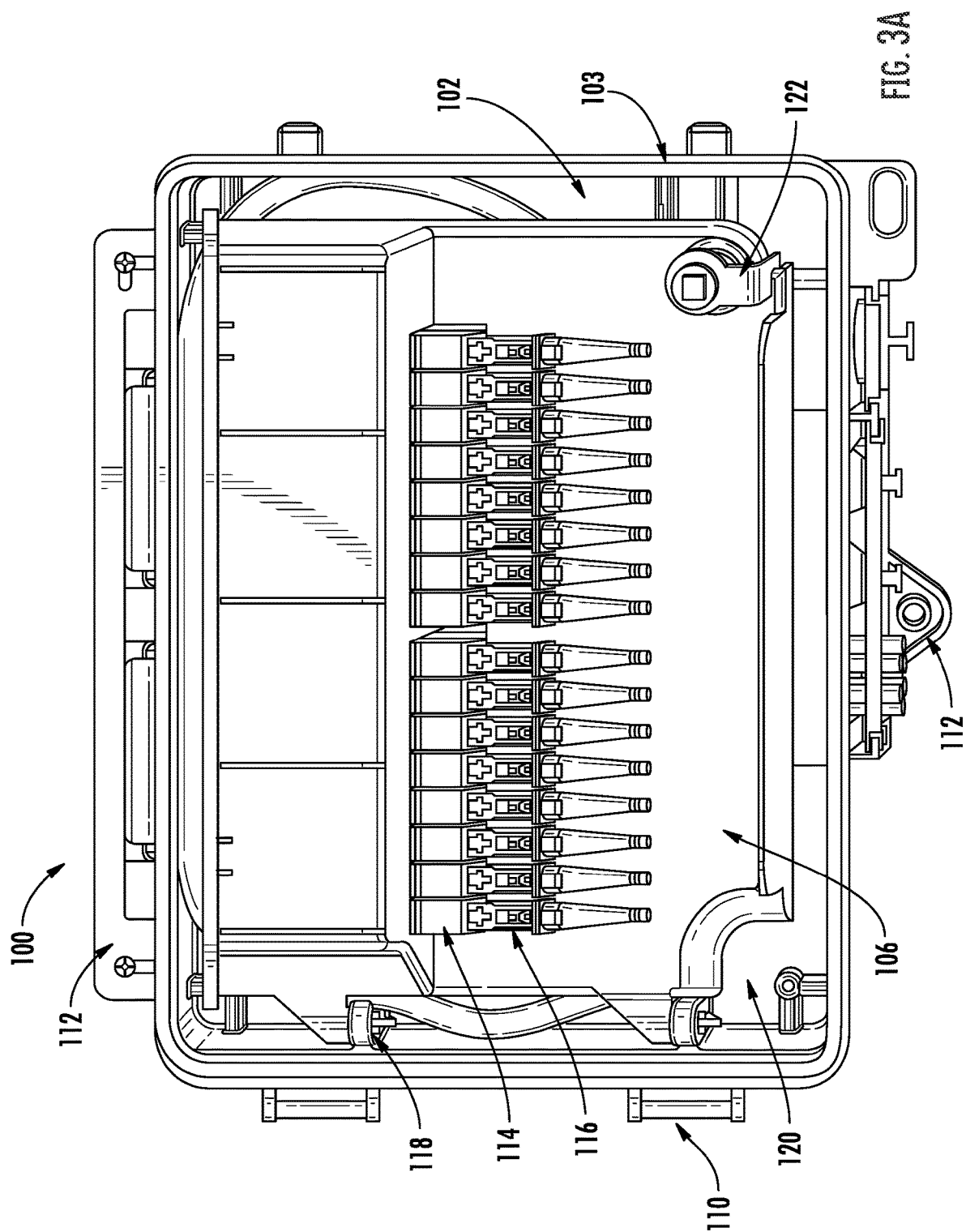

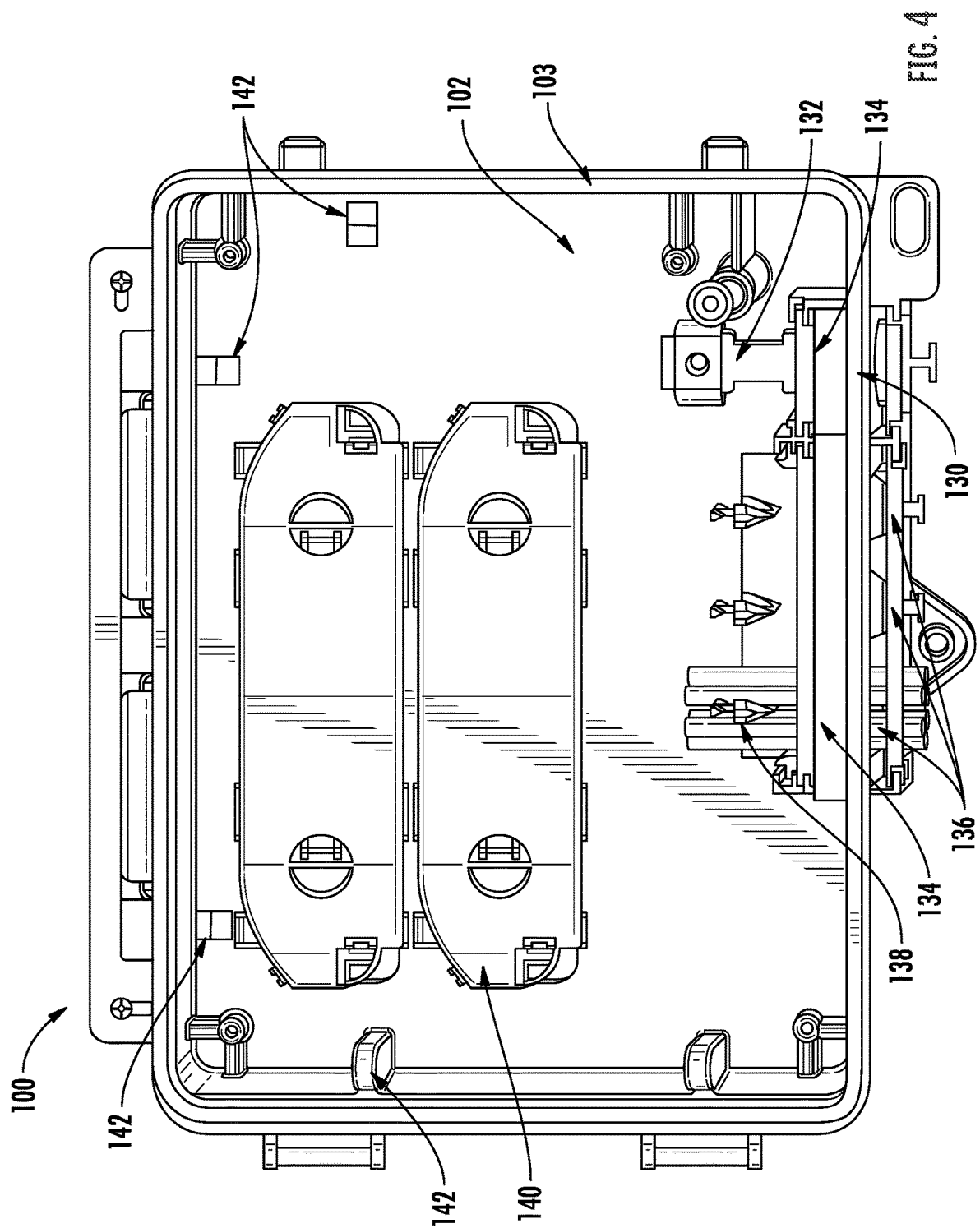

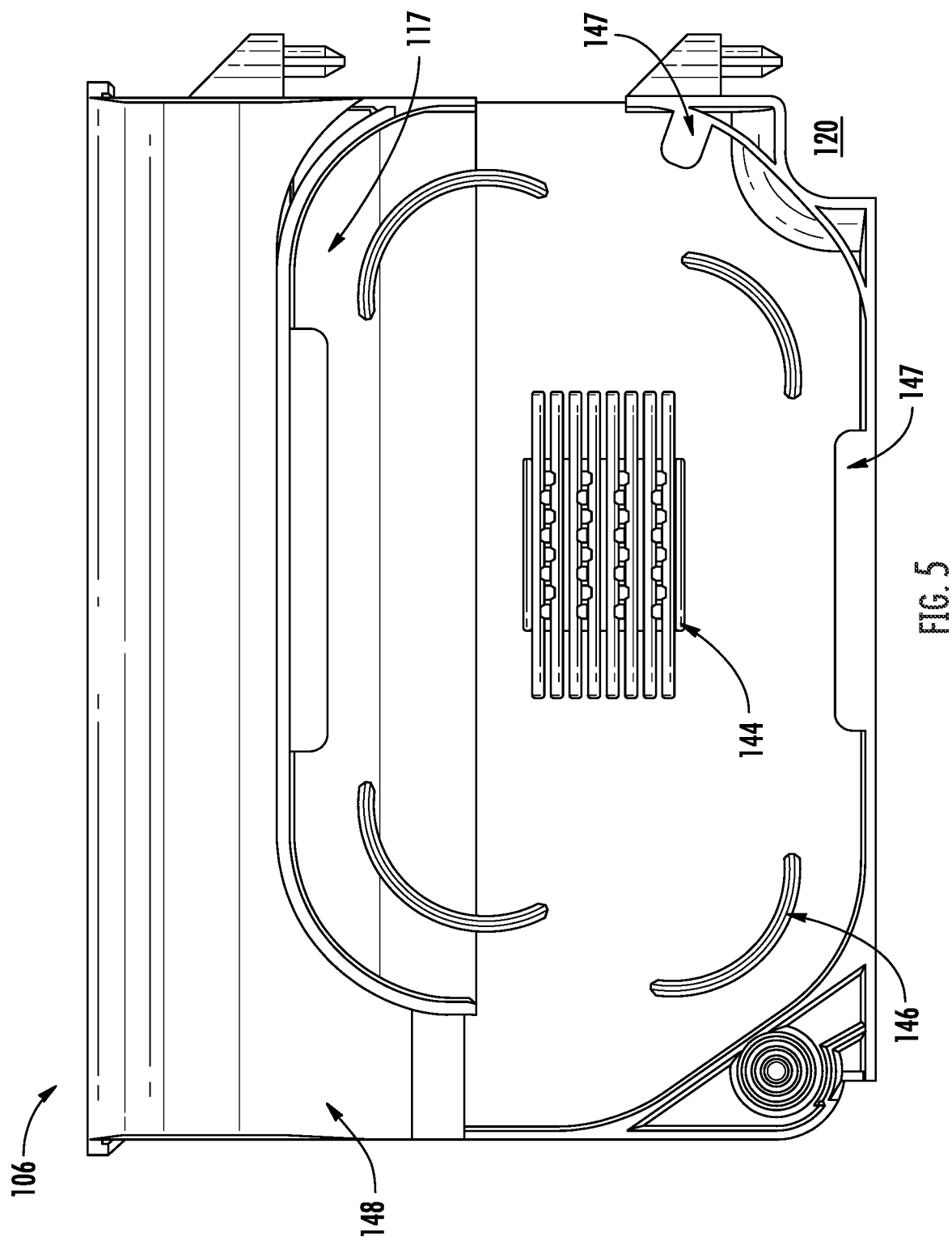

FIBER OPTIC ASSEMBLY WITH CONNECTORIZED MIDPLANE

PRIORITY APPLICATION

This application is a continuation of International Application No. PCT/US21/53287, filed on Oct. 4, 2021, which claims the benefit of priority to U.S. Application No. 63/091,375, filed on Oct. 14, 2020, both applications being incorporated herein by reference.

FIELD

This disclosure generally pertains to fiber optic assemblies, and more particularly to a fiber optic assembly including a connectorized midplane.

BACKGROUND

In fiber optic networks, fiber optic cables may be connected to various fiber optic assemblies (e.g., hardware, housings, enclosures, etc.). Fiber optic assemblies may include multiple dwelling units (MDUs) configured to transition the optical carrier from a feeder cable including multiple optical signals on one or more optical fibers to one or more subscriber cables. The MDUs may house one or more splice connections to a feeder cable, a plurality of patch connections, one or more splitters, a plurality of slice connections to subscriber cables, or the like. The number or types of cables, signal paths, and connection types may cause installation and/or repair to be complex and ins some cases time intensive.

SUMMARY

In an example embodiment, a fiber optic assembly is provided including a base configured to be mounted to a surface, a sidewall extending from the base, a cover configured to engage the sidewall to enclose a portion of the fiber optic assembly, a midplane separating a first portion of the fiber optic assembly from a second portion of the fiber optic assembly, and a hinge disposed between the midplane and the sidewall, which enables the midplane to transition between an open position and a closed position. The midplane includes a plurality of adapters disposed through the midplane from a first side to a second side and a plurality of splice holders disposed on the second side configured to retain at least one fiber optic splice connection between an optical fiber of a feeder cable and an adapter of the plurality of adapters.

The midplane provides a dedicated patch field separate from the cable entry and splice locations. This allows a clear distention between first day installers, routing cables, splicing, etc., and second day installers that connect a subscriber by connection of a patch connection. The fiber optic assembly may include parking for unused subscriber cables, further separating the first day and second day installation tasks and areas. Additionally, the midplane may provide additional layers, or planes, for fiber routing inside of the fiber optic assembly. These additional layers may allow for greater separation of functions and simplify fiber flow patterns. In many cases the fiber optic assembly may have a smaller form factor than MDUs that do not include a midplane.

The fiber optic assembly may include a hinge disposed between the sidewall of the fiber optic assembly and the midplane. The hinge may enable the midplane to transition between an open service position and a closed position. In the service position, the cable ports, strain reliefs, and splice areas may be accessed. In some embodiments, the midplane may be detachable at the hinge to enable the midplane to be moved to a work surface, such as during splicing, and then returned to the fiber optic assembly. In the closed position, the midplane may limit or prevent access to the cable ports, strain reliefs, and splice areas.

In an example embodiment, an input or feeder cable may be inserted into a cable port in the sidewall and routed to the back of a midplane. The optical fibers of the feeder cable may be spliced to pigtails of a patch panel disposed in the midplane. The splice connections may be retained on the back surface of the midplane by one or more splice holders. One or more output cables may also be inserted thought a cable port in the sidewall of the fiber optic assembly. The output cables may be pre-connectorized or may be spliced to connectors inside of the fiber optic assembly. The midplane may include a fiber routing notch at a side edge including the hinge, such that rotation of the midplane causes minimal torsion of the output fibers.

In some example embodiments, the fiber optic assembly may also include a splitter retention feature, such as tabs, projections, adhesive, or double sided tape. The splitter may be retained in separate area of the midplane, such that each function or connection within the fiber optic assembly is apportioned a separate functional space with a consistent fiber routing scheme. The splitter may be disposed proximate to the patch connections to reduce fiber routing complexity. In some example embodiments, the midplane may include a midplane cover disposed on the second side. The midplane cover may configured to enclose at least a portion of the slice connections, the adapters, and/or the splitter.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

FIGS. 2A and 2B illustrate perspective views of example fiber optic assemblies according to an example embodiment;

FIG. 3A illustrates a front view of the example fiber optic assembly of FIG. 1 with the cover removed and a midplane in a closed position according to an example embodiment;

FIG. 4 illustrates a front view of the fiber optic assembly of FIG. 1, with the cover and midplane removed according to an example embodiment;

FIG. 5 illustrates rear view of an example midplane according to an example embodiment;

Figure 1:
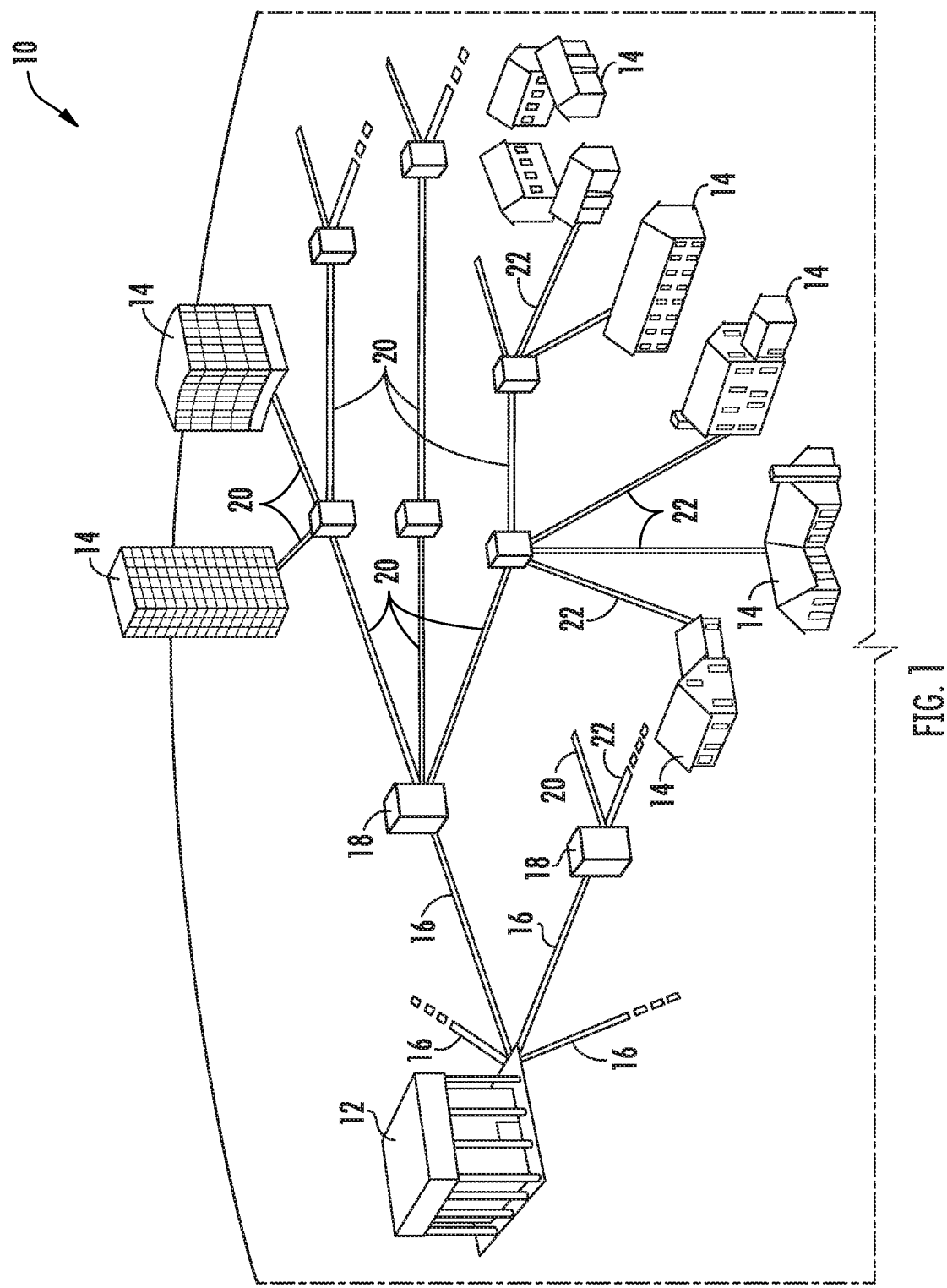
FIG. 1 is a schematic diagram of an exemplary FTTx network according to an example embodiment.

The embodiments set forth in the drawings are illustrative in nature and not intended to be limiting of the scope of the detailed description or claims. Whenever possible, the same reference numeral will be used throughout the drawings to refer to the same or like features. The drawings are not necessarily to scale for ease of illustration an explanation.

DETAILED DESCRIPTION

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A SDU or MDU terminal may be disposed at the subscriber premises 14.

There are many different network architectures, and the various tasks required to distribute optical signals (e.g., splitting, splicing, routing, connecting subscribers) can occur at several locations. Regardless of whether a location is considered a switching point, local convergence point, network access point, subscriber premise, or something else, fiber optic equipment is used to house components that carry out one or more of the tasks. The fiber optic equipment may be assemblies that include connectors, switches, splitters, splices, or the like. The term "fiber optic assembly" will be used in this disclosure to generically refer to such equipment (or at least portions thereof). In some instances such equipment is located at a subscriber premises 14 in an FTTx network, although this disclosure is not limited to any particular intended use. Further, although an FTTx network 10 is shown in FIG. 1, the same considerations apply with respect to other types of telecommunication networks or environments.

Figure 2B:
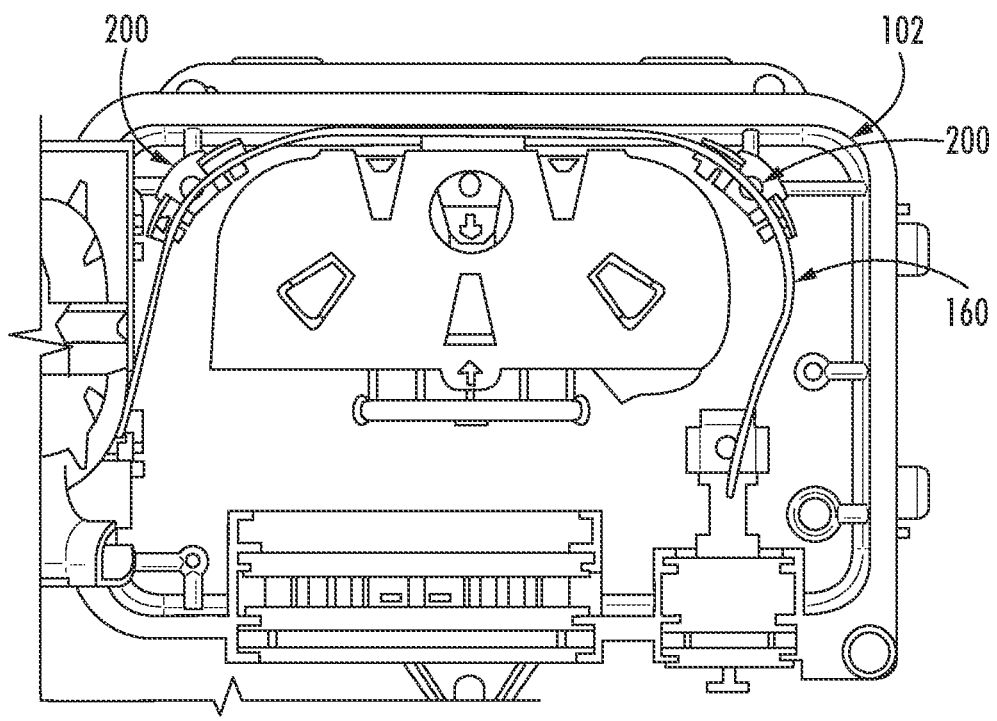

Turning to FIG. 2A, a fiber optic assembly 100 is provided. The depicted fiber optic assembly is an MDU terminal typically disposed at a multiple dwelling subscriber premises, such as a dorm, apartment building or complex, or the like. The fiber optic assembly 100 may include a base 102, a cover 104, and a midplane 106. The base 102 may be substantially planar and include a sidewall 103 extending outward from the base 102 about at least a portion of the parameter of the base 102. The base 102 and the sidewall 103 may be separate components or may be integrally formed. The base 102 and/or sidewall may be formed from plastic, such as injection molded plastic, sheet metal, such as aluminum or steel, or other suitable material. The base 102 and sidewall 103 may form a well, or box, configured to retain and/or protect fiber optic equipment disposed within. The cover 104 may be hingedly attached to the base 102 or sidewall 103. The cover 104 may be configured to transition between an open position allowing access to the fiber optic equipment and a closed position limiting or preventing access to the fiber optic equipment. The cover 104 may be configured to engage at least a portion of the sidewall 103 to enclose a portion of the fiber optic assembly 100. In some example embodiments, a sealing element 108, such as a foam, rubber, or silicone gasket, may be disposed between the cover 104 and sidewall 103 to resist entry of liquid, moisture, and/or debris. In some examples, the fiber optic assembly 100 may be configured with an ingress protection (IP) rating of IP 55, IP 65, or the like.

The cover 104 may include one or more latch features configured to retain the cover 104 in the closed position. The latch features 107 may include one or more projections or catches 107B disposed on the sidewall 103. The cover 104 may include a tab 107A configured to engage the catch 107B. The tab 107A and catch 107B may be complementary and biased toward each other, such that when the cover is transitioned to the closed position the latch features 107 engage to resist movement of the cover toward the open position. Additionally or alternatively, the fiber optic assembly 100 may include a tamper prevention feature 109. The tamper prevention feature 109 may include a pair of aligned apertures disposed on the cover 104 and the sidewall 103 or base 102. When the cover 104 is in the closed position a tamper seal, or lock, may be disposed through the apertures. As such, the lock and/or tamper seal would necessarily be removed to transition the cover 104 to the open position.

In an example embodiment, the cover 104 may include a connector parking feature disposed on an inner surface of the cover 104. The connector parking feature may include one or more adapter type apertures configured to receive and retain a fiber optic connector when not in use. In some embodiments, the connector parking feature may include a receiver configured to accept and retain a block of adapter type apertures. For example, some splitter modules may be packaged with a block of adapter type apertures for protection and organization. The block of adapter type apertures including their associated fiber optic connectors may be installed into the receiver. When a new subscriber service is desired, the connector may be removed from the connector parking feature and installed into the appropriate adapter, as described below.

The midplane 106 may separate a first portion of the fiber optic assembly 100 from a second portion of the fiber optic assembly 100. For example, the midplane 106 may separate a "day one" installation area form a "day two" installation area. The day one installation area may include one or more of cable entry, cable strain relief, splicing, splitter installation, or the like. These operation are typically performed at the time the fiber optic assembly 100 is deployed. Day two operations typically include connection of one or more optical fibers at a patch field or patch panel. As such, the midplane 106 acts as a barrier between a higher skill level installation area and a lower skill level installation area. Additionally, the components and connections in the day one installation area may be significantly more susceptible to damage than components residing in the day two installation area.

Figure 2C:
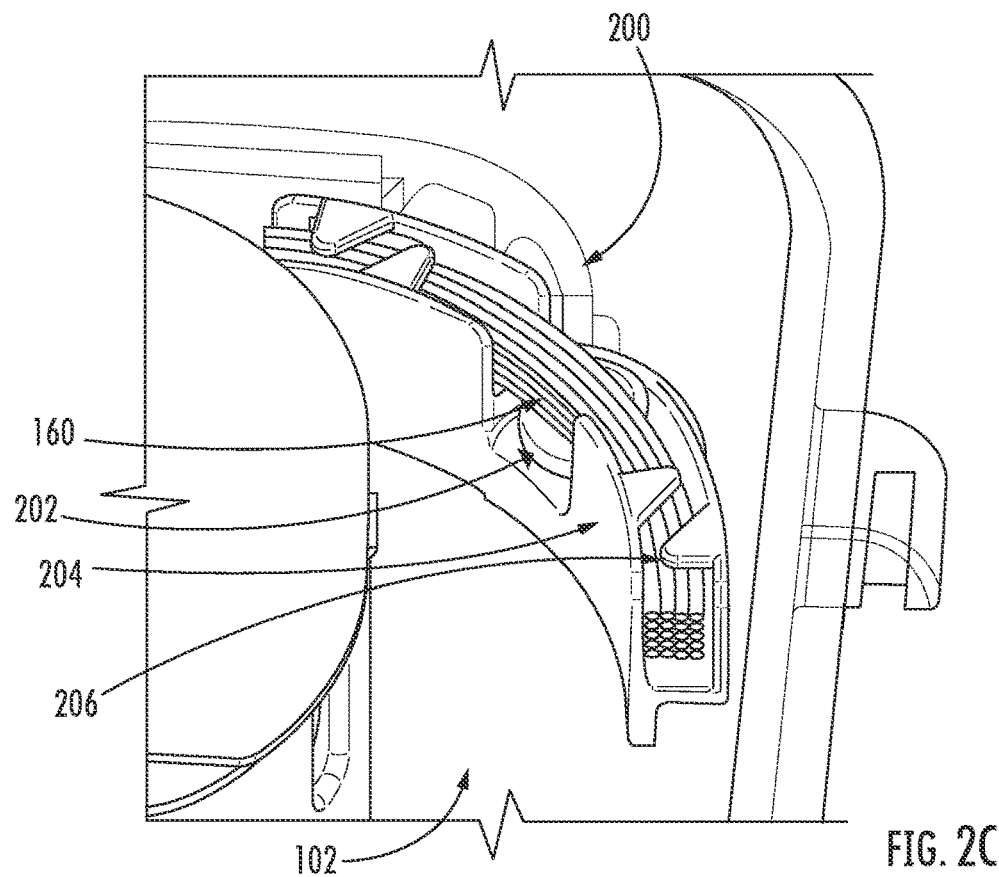
FIGS. 2C and 2D illustrate detail views of the corner routing guide of FIG. 2B according to an example embodiment.
Figure 2D:
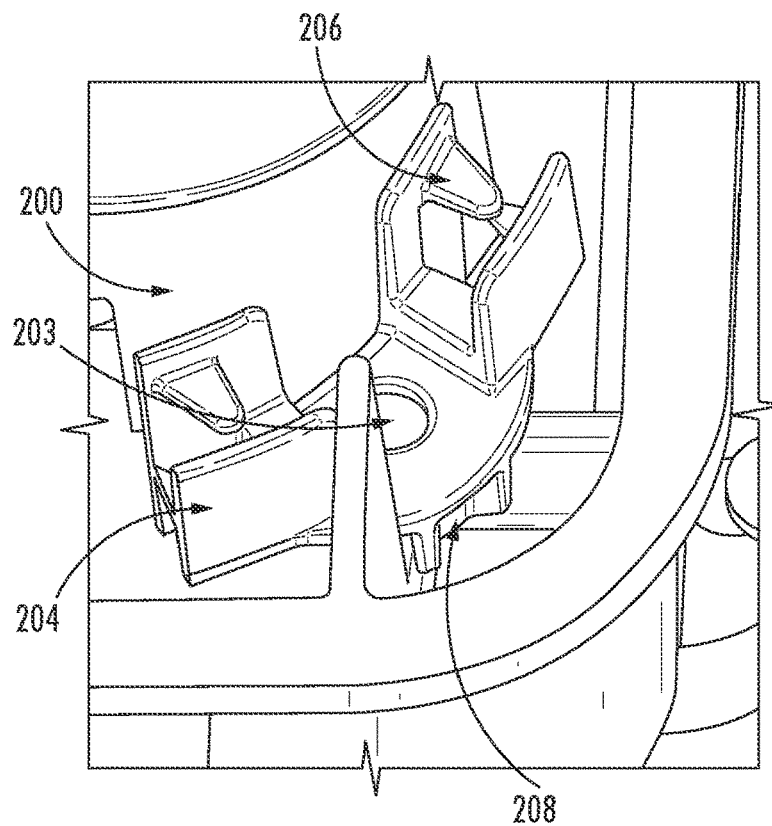

In the depicted example, an input cable 160 is routed about the perimeter of the base 102. In the example depicted in FIG. 2B-D, a corner routing guide 200 may be disposed on the base 102, such as at each upper corner of the base. The corner routing guide 200 may be configured to route the input cable 160 to a position within the base 102 at which the input cable transitions to the midplane 106. The corner routing guide 200 may be configured to provide a minimum bend radius for the input cable 160. The corner routing guide 200 may be integral to or be removable from the base 102. For example, the corner routing guide 200 may include a fastener, such as a tab or snap feature configured to engage the base 102. In the embodiments depicted in FIGS. 2C and 2D the corner routing guide 200 includes a fastener aperture 203 configured to receive a fastener 202, such as a screw therethrough. The corner routing guide 200 may include one or more sidewalls 204 that form a channel through which the input cable 160 is routed. In an example embodiment, the corner routing guide may include down holds 206, or lateral projections configured to resist removal of the fibers from the corner routing guide 200. In some example embodiments, the corner routing guide 200 may include a rotation block 208. The rotation block 208 may interface with one or more features of the base 102. The rotation block 208 may limit or prevent rotation of the corner routing guide 200.

In addition to separating day one and day two installation areas, the midplane 106 may also provide additional surfaces, or layers, for optical connections and/or cable/fiber routing. For example, the midplane 106 may include a plurality of adapters, which may be arranged in a patch panel, one or more splice holders, fiber routing guides, splitter storage, or the like. The layering of functions and fiber routing paths in the fiber optic assembly 100 may reduce the complexity of installation and/or service, which may in turn reduce associated installation costs and increase service life of the fiber optic assembly 100. The midplane 106 is discussed in further detail below.

FIG. 3A illustrates the fiber optic assembly with the cover 104 removed for clarity. A cover hinge 110 may be disposed on the sidewall 103. The cover hinge 110 may be a pin and receiver hinge, a bar and snap on hinge, or any other suitable hinge. The base 102 may include one or more mounting features 112 configured to mount the fiber optic assembly 100 to a surface, such as an exterior or interior wall of a subscriber premises 14. The mounting feature 112 may include apertures to receive a fastener or an integral fastener disposed on, or through, the base 102. In some embodiments, the mounting feature 112 may include a mounting plate extending from the base 102. The mounting plate may enable mounting of the fiber optic assembly 100 without opening the fiber optic assembly 100. Mounting of the fiber optic assembly 100 without opening the cover 104 and/or midplane 106 to access the base 102, may limit interaction with fiber optic equipment disposed internal to the fiber optic assembly 100, thereby reducing installation time and potential damage to the fiber optic equipment. The mounting plate may be integrally formed with the base 102, or may be attached to the base 102 using interference fit, fasteners, adhesive, welding, polymer fusion, or other suitable connection.

The midplane 106 includes a first surface, e.g. a subscriber side, including a plurality of fiber optic adapters 114. The fiber optic adapter 114 may be configured to receive a fiber optic connector 116. The fiber optic connector 116 may be connected to a subscriber cable. The fiber optic adapters 114 and associated fiber optic connectors 116 may be simplex, single optical fiber, connections including, but not limited to Standard Connector or Subscriber Connector (SC) connector or adapters, Lucent Connector (LC) connectors or adapters, or the like. Additionally or alternatively, the fiber optic adapters 114 and associated fiber optic connectors 116 may be duplex, two optical fiber connectors (one transmit and one receive), including but not limited to duplex SC connectors or adapters, duplex LC connectors or adapters, MDC connectors or adapters (sometimes referred to as "mini duplex connectors") offered by U.S. Conec, Ltd. (Hickory, NC), and/or SN connectors or adapters (sometimes referred to as a Senko Next-generation connectors) offered by Senko Advanced Components, Inc. (Marlborough, MA). In the depicted embodiment, the midplane includes 16 LC adapters, however any suitable number of adapters 114 may be used, including without limitation 4 adapters, 8 adapters, 16 adapters, 24 adapters, 48 adapters, or 72 adapters based on the size of the fiber optic assembly 100 and the type of connector.

One or more midplane hinges 118 may be disposed between an edge of the midplane 106 and the sidewall 103. The midplane hinges 118 may enable the midplane to transition between an open, or service, position and a closed position. The midplane hinges 118 may be pin and receiver hinges, bar and snap on hinges, or any other suitable hinge. In some example embodiments, the midplane 106 may be removable to enable fiber optic connections, such as splicing to occur on a work surface and subsequently returned to the fiber optic assembly 100. In such embodiments, the midplane hinges 118 may be configured to selectively release the midplane 106, such as lifting of a pin out of the receiver or unsnapping a snap on hinge. In an example embodiment, the pin, snap on hinge or similar structure may include a projection, or barb, to provide resistance to removal of the midplane 106 to prevent inadvertent removal.

Figure 3B:
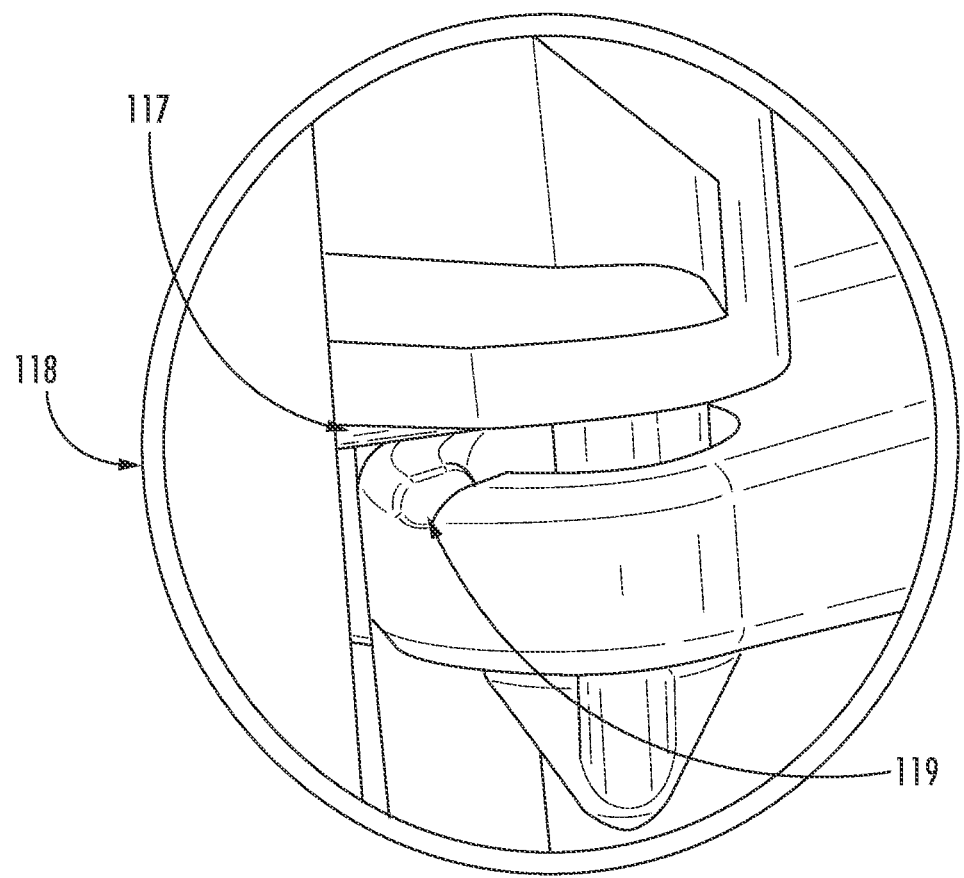
FIG. 3B illustrates a detail view of the midplane hinge of FIG. 3A according to an example embodiment.

As shown in greater detail in FIG. 3B, the hinge 118 may include a hinge stop. The hinge stop may include a detent 119 and a bump projection 117. The hinge 118 may rotate toward the service position until the bump projection 117 drops into the detent 119. The engagement of the bump projection 117 and the detent may resist rotation of the hinge, thereby maintaining the midplane in the service position, such as 90 degrees rotated. The midplane may be rotated further or returned to the closed position by increasing the force applied to the midplane 106 to cause the bump projection 117 to rotate out of the detent. Additionally or alternatively, the midplane 106 may be lifted slightly to withdraw the bump projection 117 from the detent 119.

In some embodiments, the midplane 106 may include a lock or latch 122 configured to resist movement of the midplane 106 from the closed position to the open position. In an example embodiment, the latch 122 may include a first element, such as a tab, disposed on the midplane 106 and a second element, such as a catch or receiver, disposed on the base 102 or sidewall 103. The first and second elements may be complementary and/or biased toward each other, such that then engage each other when the midplane 106 is in the closed position and resist movement of the midplane 106 toward the service position. In some example embodiments, the latch 122 may be a rotating or pivoting projection disposed on the midplane 106. The projection may be configured to transition between a locked position, in which the latch 122 engages a portion of the base 102 or sidewall 103, and an unlocked position. The latch 122 may resist movement of the midplane 106 from the closed position toward the open position in the locked position, and allow movement of the midplane 106 when the latch 122 is in the unlocked position. In some embodiments, the latch 122 may be a quarter turn latch configured to rotate about latch axis approximately ninety degrees between the lock position and the unlocked position.

The midplane 106 may include a notch 120 disposed on an edge of the midplane 106. The notch 120 may enable one or more subscriber cables to transition from the day two, or subscriber portion, of the fiber optic assembly 100 to the day one installer portion of the fiber optic assembly 100. The notch 120 may be disposed at the edge of the midplane 106 that the midplane hinge 118 is disposed. Colocation of the notch 120 and the midplane hinge 118 may limit or prevent rotational torsion or bending of the subscriber cables during transitions of the midplane 106 between the open and closed positions. In some embodiments, the notch 120 may be contoured, such as curved, to limit bending of the subscriber cables. For example, the curvature of notch 120 may be greater than a minimum bend radius of the subscriber cables.

FIG. 4 illustrates the base 102 with the cover 104 and the midplane 106 removed to show additional features. The base 102 and/or sidewalls 103 may include one or more cable ports, such as inlet, or feeder, cable port 130 and outlet, or subscriber, cable ports 136. The cable ports 130, 136 may be apertures disposed in the base 102 or sidewall 103 configured to enable a fiber optic cable to pass from the exterior of the fiber optic assembly 100 to the interior of the fiber optic assembly 100. An input strain relief 132 may be disposed proximate to the input cable port 130. The input strain relief 132 may be configured to restrict movement of the input cable to limit or prevent axial torsion applied to the input cable from being transferred to the fiber optic equipment. Similarly, an output strain relief 138 may be disposed proximate to the output cable port 136. The output cable port 138 may be configured to restrict movement of one or more output cables, or cable bundles, to limit or prevent axial torsion applied to the output cables from being transferred to the fiber optic equipment. A cable seal 134 may be disposed about the input cables and/or the output cables in the cable ports 130, 136. The cable seal 134 may include a compressible foam, rubber, silicone, or the like. The cable seal 134 may be compressed between the input cable, the output cables, and/or the cable port to form a barrier to liquid, moisture, and/or debris. In some example embodiments, the cable ports 130, 136 may be disposed below a plane defined by the midplane 106 in the closed position, such that the cable entry, cable sealing, and cable strain relief functions reside in the day one, or installer portion, of the fiber optic assembly 100. In some embodiments, the fiber optic assembly 100 may have separate clearly defined, such as by size or shape, input cable ports 130 and output cable ports 136 to assist the installer with cable flow and routing within the fiber optic assembly 100.

In some example embodiments, the base 102 may include one or more splice trays 140. The splice trays 140 may be configured to retain one or more fiber optic slices, such as output cable splices. In an example embodiment, the splice trays 140 may also include slack storage, such as upper and lower projections extending outward from a spool feature. The spool feature may be cylindrical or partially cylindrical. In some embodiments, the spool may have a diameter that is greater than a minimum bend radius of the output cable.

In an example embodiment, one or more cable retention features 142 may be disposed about a periphery of the base 102 or sidewall 103. The cable retention features 142 may have a loop structure configured to substantially surround a cable. The cable retention features 142 may have a gap through a portion if the loop structure to enable cables to be inserted laterally into the loop structure. In some instances, the gap may be angled out of an axis parallel with direction of the cable routing to prevent or limit inadvertent removal of the cable from the retention feature. Cable routing is discussed further in reference to FIGS. 6A-8.

FIG. 5 illustrates the second surface of the midplane 106. The midplane 106 may include one or more splice holders 144 disposed on the second surface. The splice holders 144 may be configured to retain mechanical or fusion splices. The splice holders 144 may be configured to retain the splice and a splice protector in an interference or snap fit channel. The midplane 106 may also include one or more slack storage features 146. The slack storage features 146 may include curved projections from the second surface of the midplane 106 configured for a cable or fiber to be routed around or within. The curved projections may include a diameter greater than the minimum bend radius of a cable or fiber routed thereon or therein. In some instances, the storage features 146 may include additional projections 147 disposed substantially parallel to the second surface, such as extending outward from the curved projections. The additional projections 147 may limit or prevent the cable or fiber from uncoiling or coming off of the slack storage features 146. As shown in FIG. 7, the second side of the adapters 114 extends through the midplane 106. A midplane cover 148 may be provided to cover, one or more of the adapters 114 (as depicted in FIG. 5), the splice holders 144, slack storage features 146, or splitter 150 (as shown in FIGS. 6A-7).

In embodiments in which a splitter 150 is utilized, the splitter 150 may be disposed on the second surface of the midplane 106. For example the splitter 150 may be disposed proximate to the splice holders 144 and/or the slack storage features 146. Alternatively, the splitter 150 may be disposed proximate to the adapters 114. As depicted in FIGS. 5 and 7, the midplane 106 may include one or more separation structures 117 separating a splice/a slack storage area from an adapter area. For example, a portion of the midplane 106 may be configured as a patch panel 152 retaining the adapters 114. The separation structure 117 may form a portion of the slack storage features 146 and limit fiber routing flow patterns. In the adapter area, the patch panel 152 may extend outward from a plane P defined by the midplane 106, such that the adapters 114 are disposed at an angle θ equal to less than 90 degrees to the plane P. By rotating the angle θ of the adapters 114, a smaller depth profile for the optical connections and fiber optic assembly 100 overall may be achieved. Angling of the patch panel 152 also creates a space between the rear side of the adapters 114 and the second surface of the midplane 106. In some example embodiments, the splitter 150 may be disposed in this space. The midplane 106 may include one or more retention features 154 configured to retain the splitter 150 in a predetermined location. For example, the retention features may include one or more projections extending from the midplane 106. The splitter 150 may be interference fit between the projections or the projections may include one or more tabs configured to grip or engage a portion of the splitter 150. Additionally or alternative, the retention features 154 may include one or more of a fastener, adhesive, double sided tape, or the like.

Figure 6A:
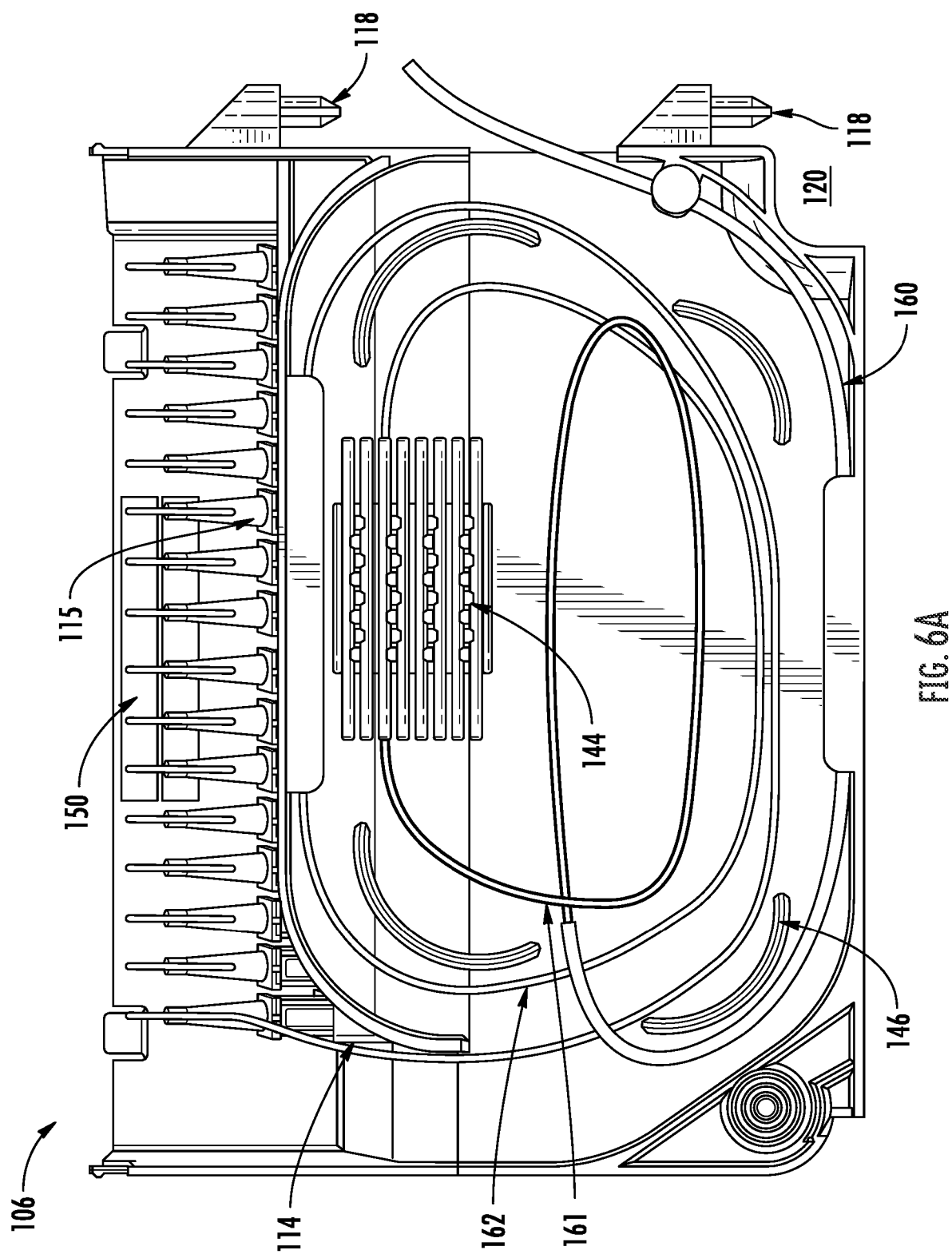
FIGS. 6A-6C illustrate a rear view of a midplane including various fiber routing patterns according to an example embodiment.
Figure 7:
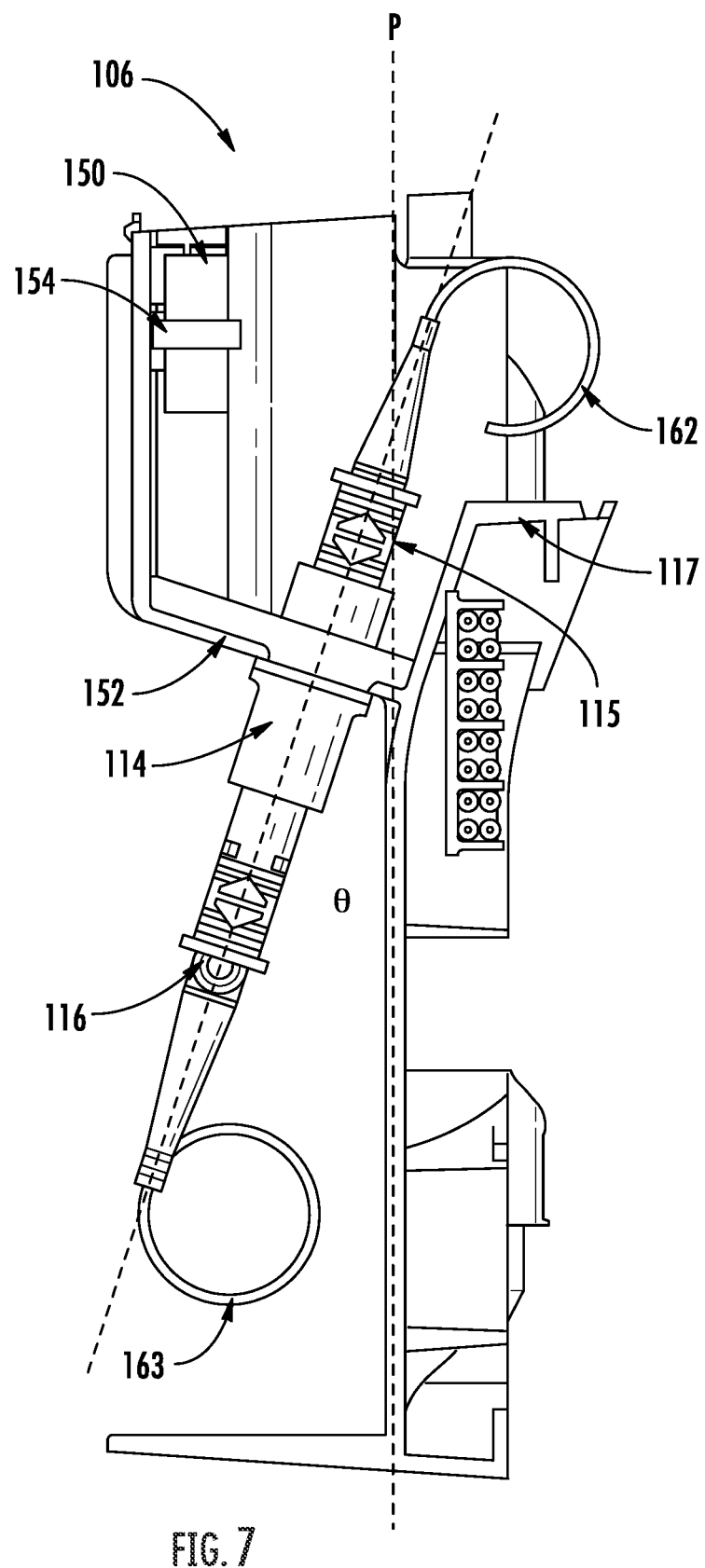
FIG. 7 illustrates a side view of a midplane according to an example embodiment.

FIG. 6A illustrates the midplane 106 with the midplane cover 148 removed to expose the adapters 114 and a splitter 150. Additionally, FIG. 6A illustrates an example cable routing. An input cable 160 may be routed to the second surface of the midplane 106. The input cable 160 may be routed between the lower and upper pins of the midplane hinges 118. The input cable 160 may be routed between the midplane hinges 118 in a substantially vertical orientation, e.g. parallel with an axis of rotation of the midplane hinges 118, such that bending of the input cable 160 is minimized. The input cable 160 may be routed around one or more of the slack storage features 146, and a portion of the input cable 160, e.g. a cable jacket may be removed to break out one or more input fibers 161. The input fibers 161 may be spliced to a connector fiber 162, e.g. a connector pig tail, and splice connection may be inserted into the splice holder 144. The connector fiber 162 may be routed around one or more of the slack storage features and terminate at one of a plurality of connectors 115 inserted into the adapters 114 of the patch panel. A connecter 116 including a subscriber cable 163 may be connected to the opposite side of the adapter 114 on the first face, as depicted in FIG. 7.

Figure 6B:
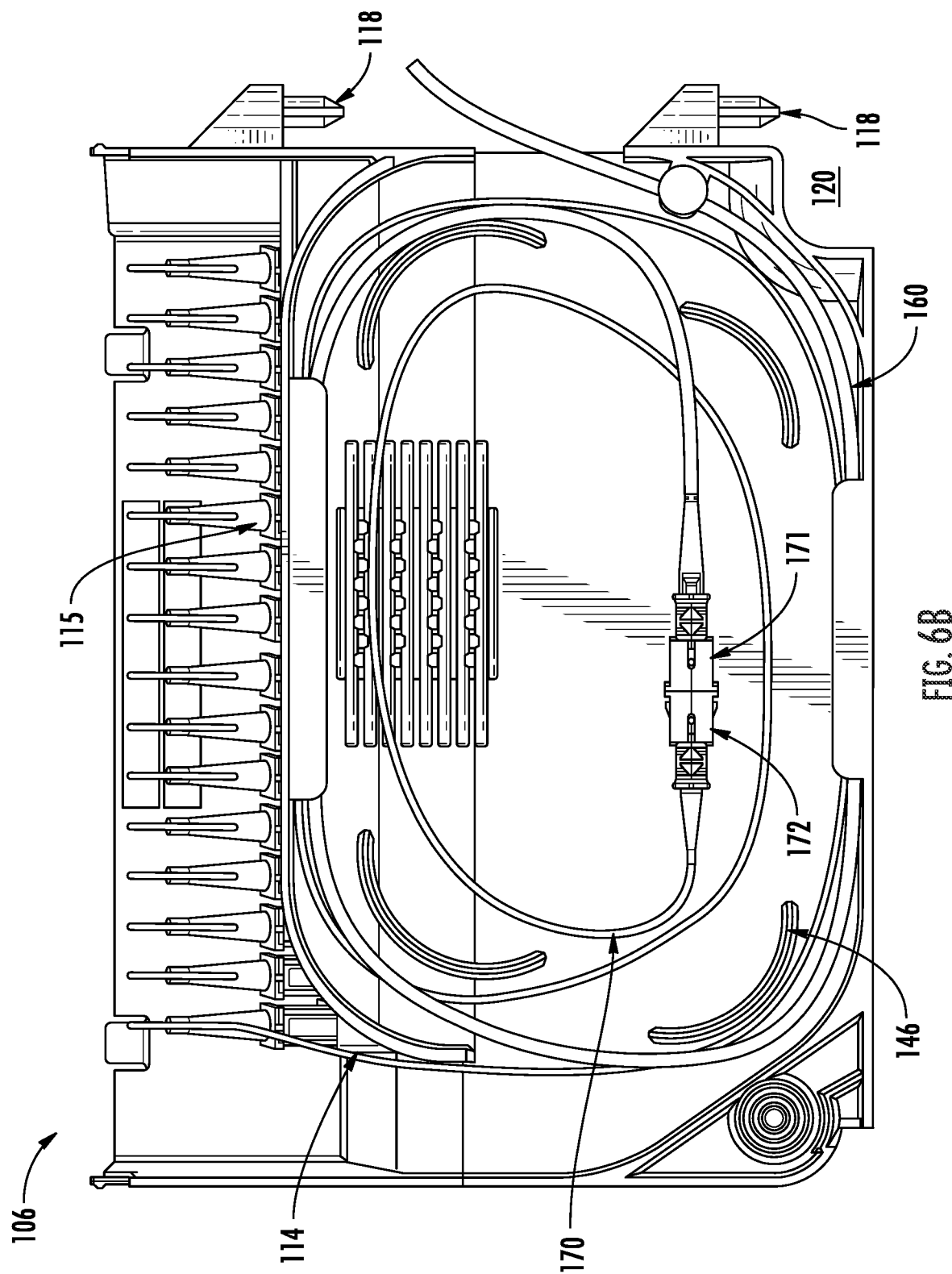

FIG. 6B illustrates another possible cable routing on the midplane 106. The midplane 106 may include a breakout cable 170. The input cable 160 may include a multi-fiber connector 171, such as an MPO connector. The breakout cable 170 may include a complementary multi-fiber connector 172 at a first end and a plurality of connectors 115, such as SC connectors or LC connectors at a second end. The connectors 115 at the second end may be connected to the second side of the adapters 114. The input cable 160 and/or the breakout cable 170 may be routed around the slack storage features 146, such that the multi-fiber connectors 171,172 are disposed on the second surface of the midplane 106. In some example embodiments, a connector retention feature may be disposed on the second surface of the midplane 106 to limit or prevent movement of the multi-fiber connectors 171,172. The connector retention features may include projections, tabs, adhesive, fasteners, double sided tape or other suitable retention features.

Figure 6C:
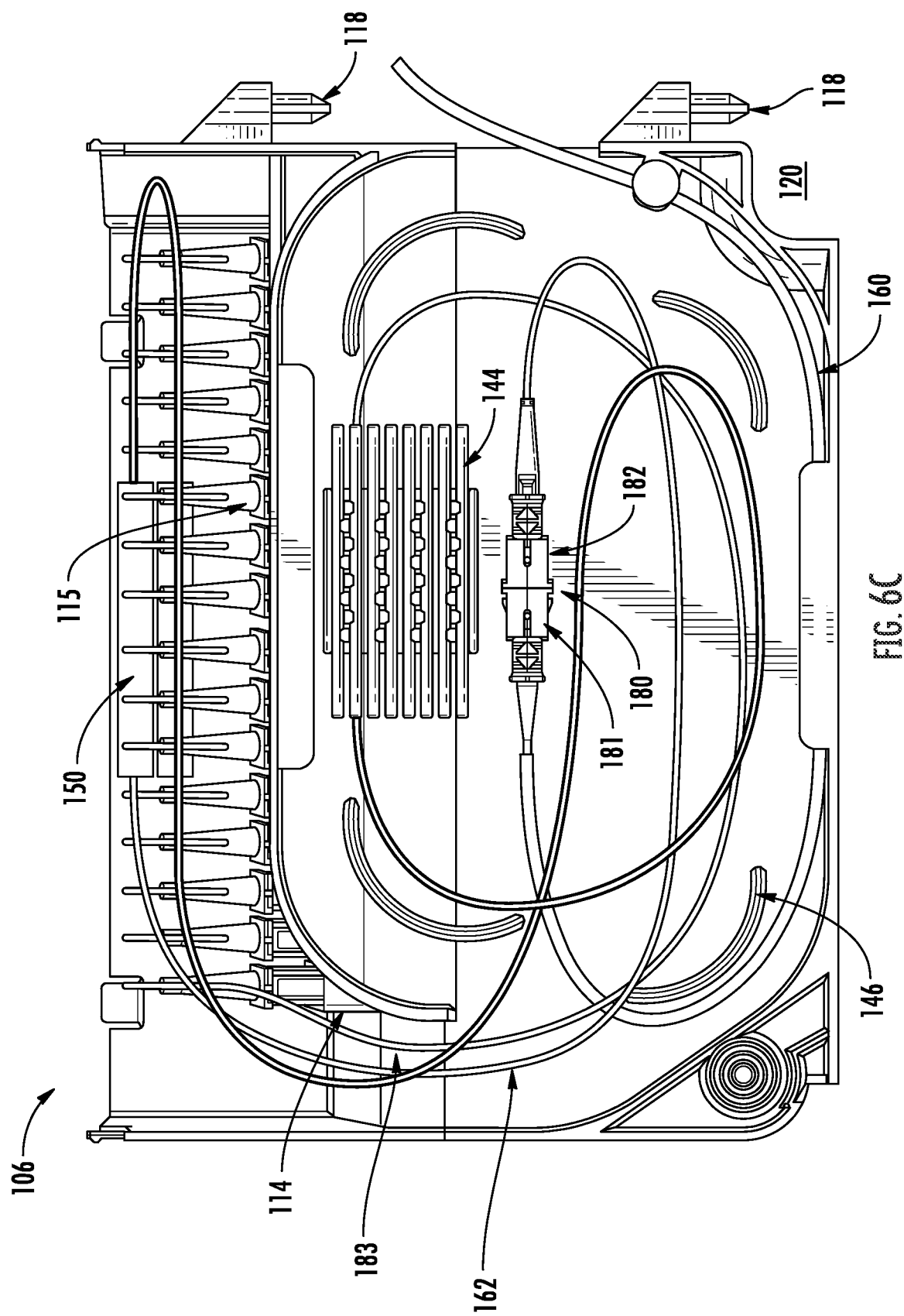

FIG. 6C illustrates a further example routing on the midplane 106. The input cable 160 may include a connector 180 configured to optically connect to an input connector 181 of a splitter input cable 182. The splitter 150 may have a plurality of output cables which may be pre-connectorized, such that each output cable may be directly connected to the adapters 114. In the depicted embodiment, the output cables 183 are not pre-connectorized. The output cables 183 may be spliced with a connector fiber 162 including a connector 115 and the splice may be inserted in the splice holder 144. Slack in the output cables 183, input cable 160, splitter input cable, or the like maybe routed around one or more of the slack storage features 146.

The depicted routing patterns are merely illustrative, other routing and optical connections are contemplated. For example, in some embodiments the input fibers 161 may be pre-connectorized, such that the input fibers 161 connects directly to the adapters 114 without an intermediate splice connection or breakout cable. In another example, the input fibers 161 may be spliced to an input of the splitter 150 and the output fibers of the splitter 150 may be spliced to the connector fiber 162. In each of the examples, the midplane 106 provides separate designated areas for fiber and cable routing and optical connections. The additional layers and designated areas for each function simplifies installation and service of the fiber optic assembly 100.

Figure 6D:
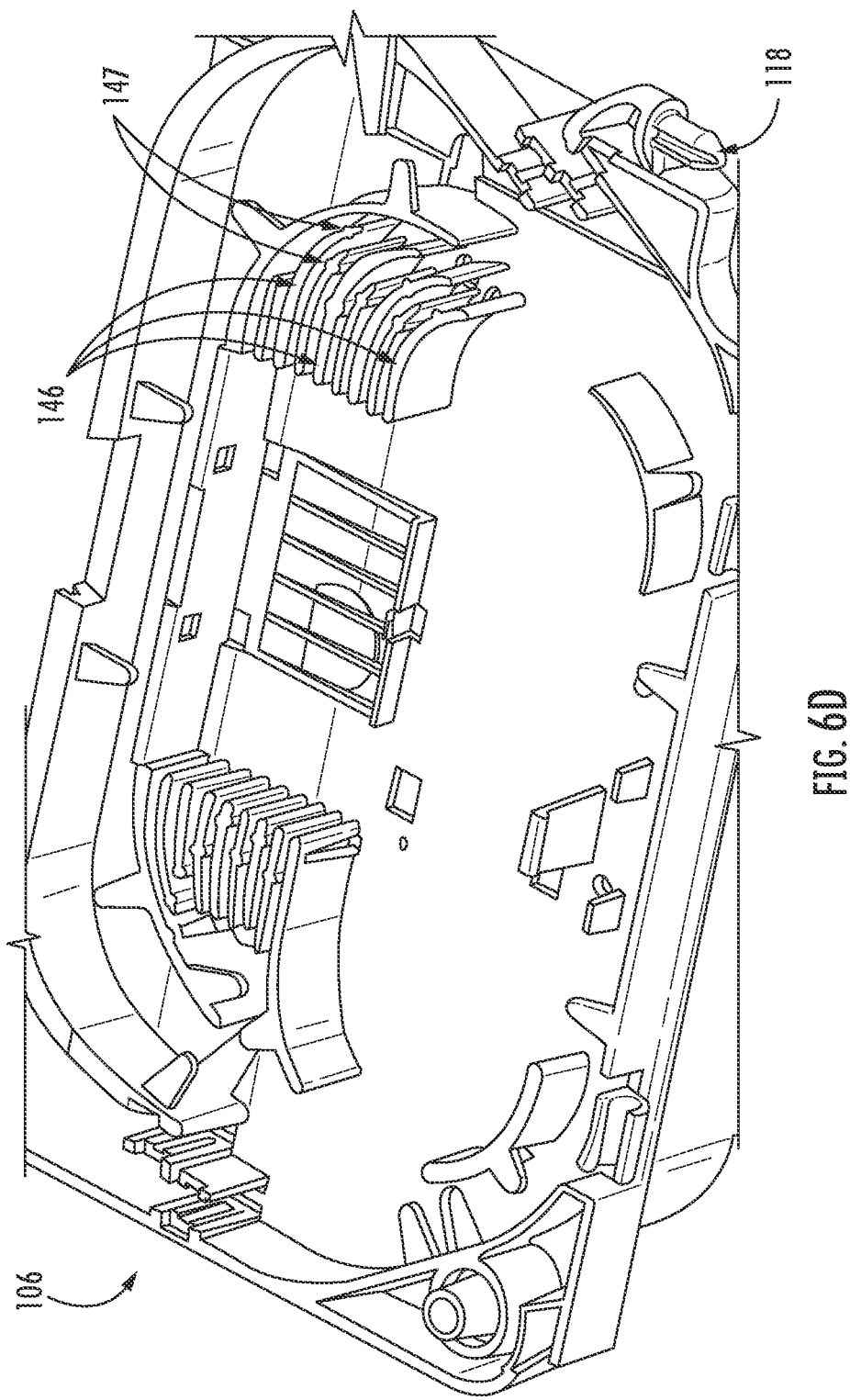
FIG. 6D illustrates slack storage features arranged to form a plurality of fiber channels according to an example embodiment.

In the example depicted in FIG. 6D, the slack storage features 146 may form a plurality of fiber channels. Each of the fiber channels may be configured to guide and retain one or more fibers, such as two 900 μm fibers. In some embodiments, one or more of the fiber channels may include hold down projections 147. The hold down projections 147 may extend from the slack storage features 146 and may be configured to resist removal of the fibers from the fiber channels.

Figure 8:
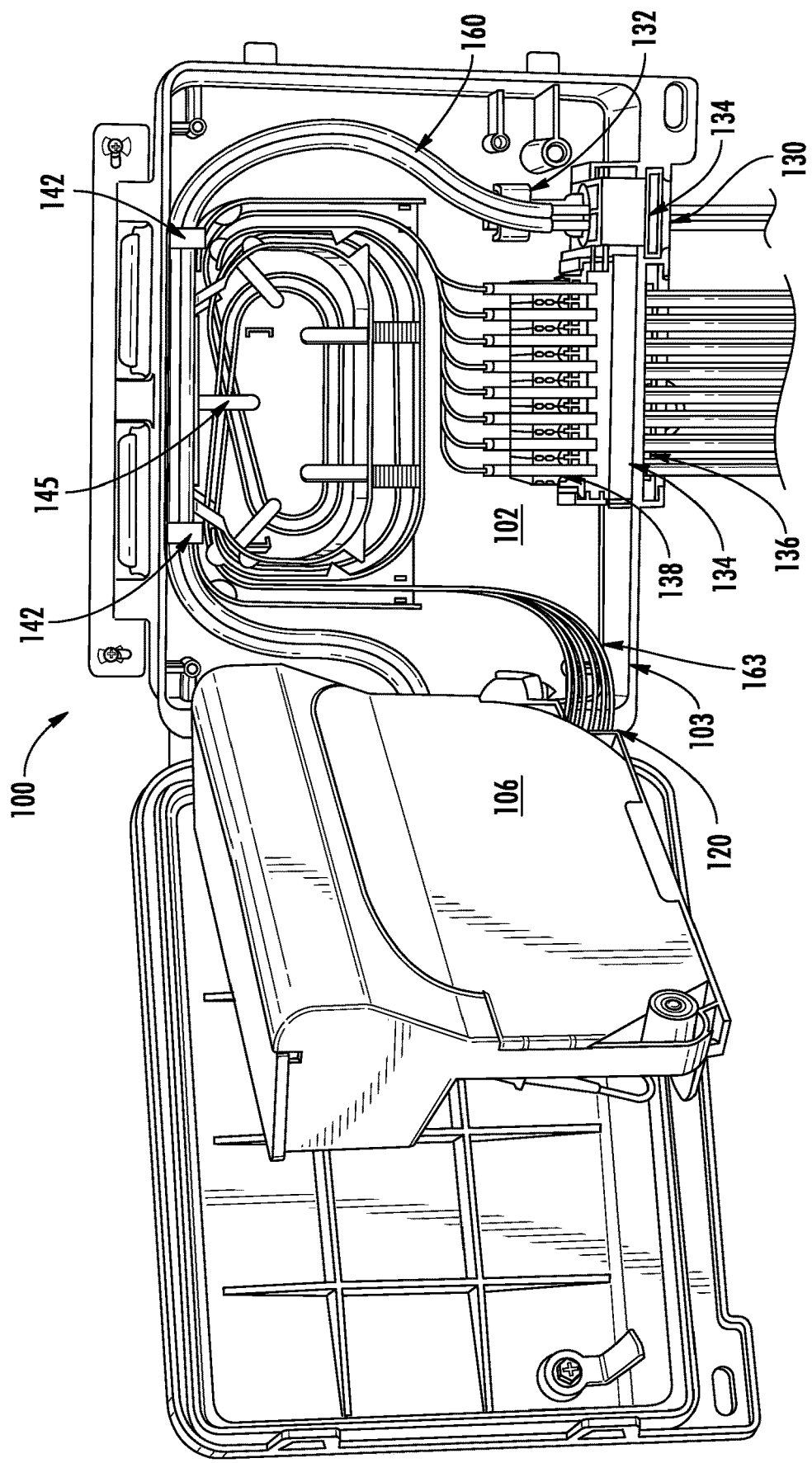
FIG. 8 illustrates a perspective view of a fiber optic assembly including optical fiber routing according to an example embodiment.

Turning to FIG. 8, the cover 104 and midplane 106 are in the open position enabling access to the day one portion of the fiber optic assembly 100. The input cable 160 is routed through the cable port 130 and cable seal 134, and the input cable 160 is axial restrained by the strain relief 132 on the interior side of the cable port 130. The input cable 160 may then routed near the periphery of the base 102 through one or more cable retention features 142 to the midplane 106 as discussed above in reference to FIGS. 6A-6C. Similarly, the subscriber cables 163 may be routed through the notch 120 disposed at the hinge side edge of the midplane 106. The subscriber cable 163 may be routed through a slack storage feature 145 coupled to the base 102. In embodiments including a splice connection in the subscriber cable 163, the subscriber cable 163 may be routed to a splice tray 140, as depicted in FIG. 4, or a splice holder. The splice tray 140 and/or splice holder may be configured to accommodate 250 um fiber, 900 um fiber, or other suitable fiber diameters. From the splice tray 140 or slack storage feature 145, the subscriber cable 163 may be routed through the output cable port 136 and cable seal 134. The subscriber cable 163 may be axially restrained by the output strain relief 138 disposed at the interior side of the output cable port 136. In this configuration, the base 102 supports cable entry, cable strain relief, subscriber cable splicing, and fiber routing functions.

Figure 9:
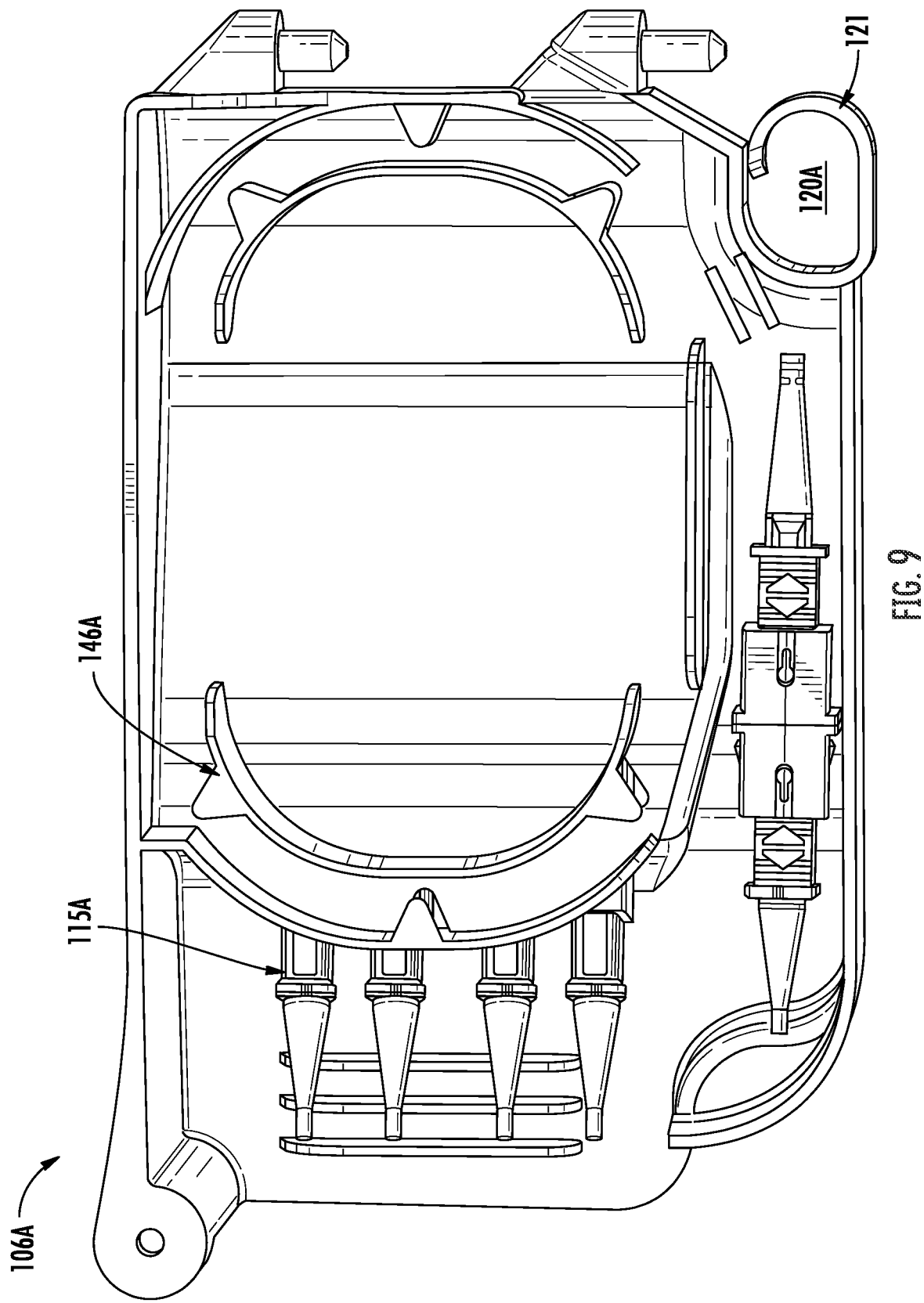
FIG. 9 illustrates a rear view of another example midplane according to an example embodiment.

FIG. 9 illustrates another example midplane 106A. The depicted midplane 106A includes four connectors 115A configured to optically connect to four adapters (not shown). In an example embodiment, the notch 120A may include a fiber guide loop 121. Even in smaller form factors, such as the depicted embodiment, the separate designated areas for the optical connections and fiber routing are present. The fiber guide loop 121 may enclose a portion of the notch 120A to limit movement of subscriber cables out of the notch 120, which may reduce or eliminate pinching of subscriber cables 163 between the midplane 106A and the sidewall 103.

Figure 10:
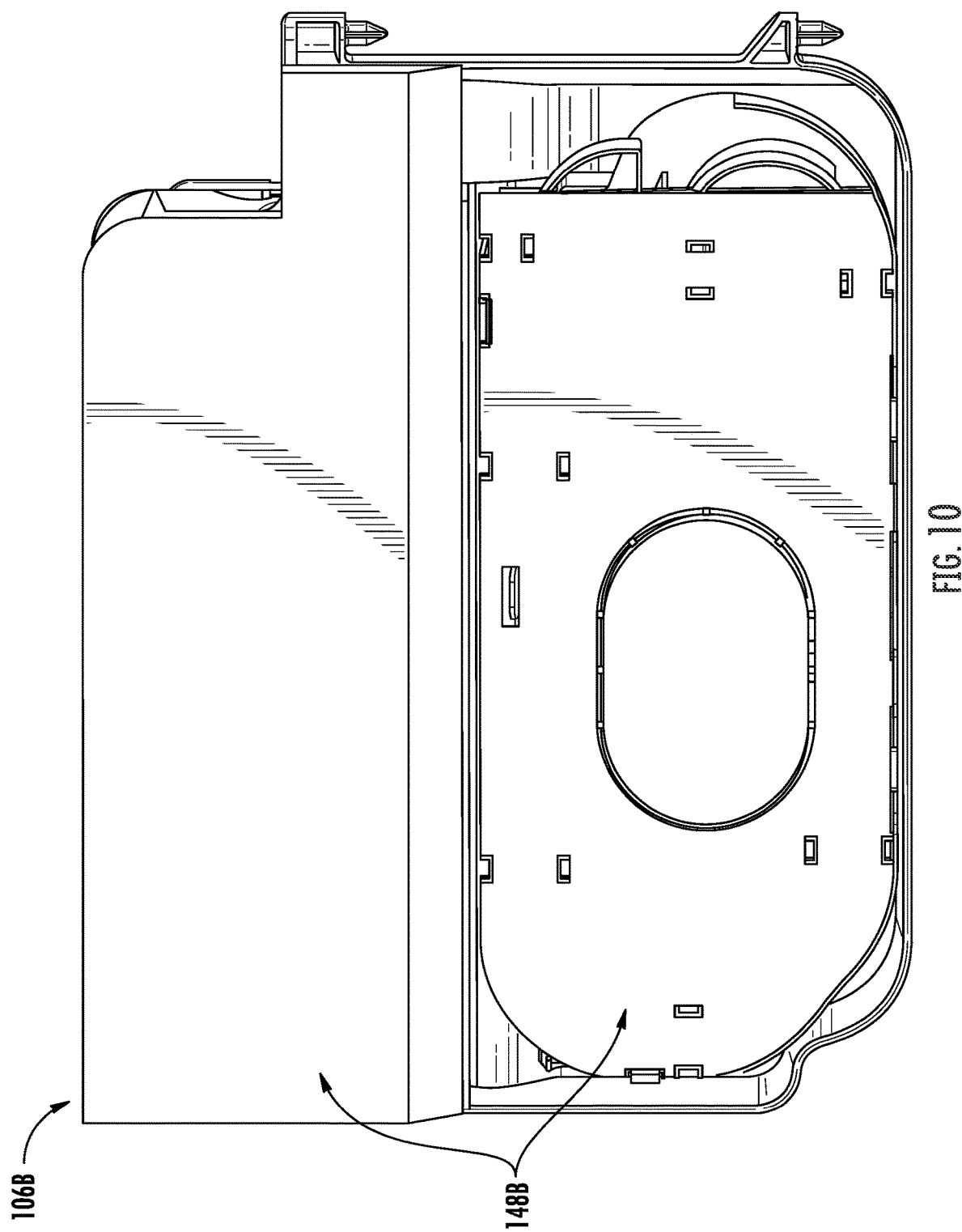
FIG. 10 illustrates a rear view of an example midplane with an increased patch panel capacity according to an example embodiment.
Figure 11:
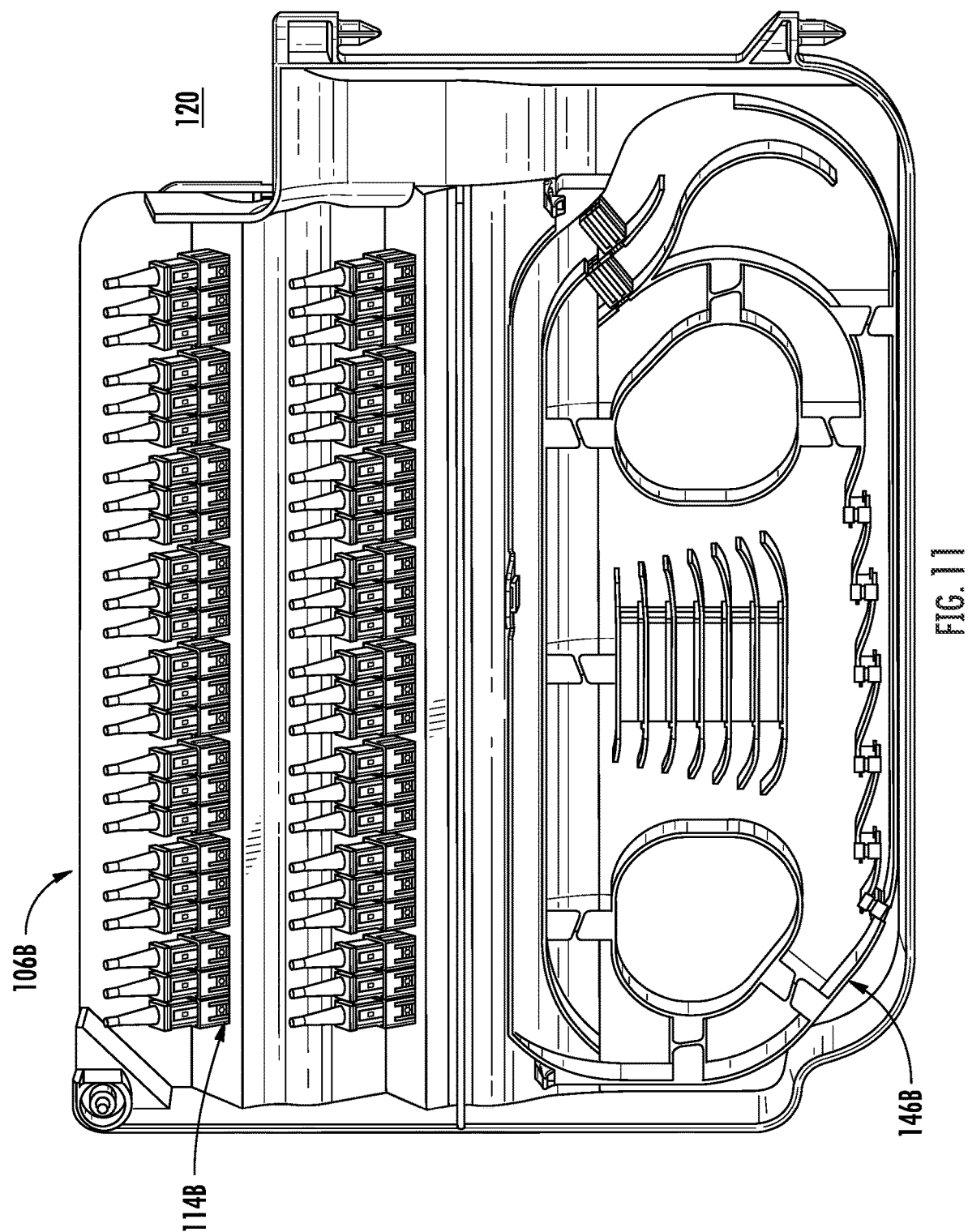
FIG. 11 illustrates rear view of midplane of FIG. 10 with a midplane cover removed according to an example embodiment.
Figure 12:
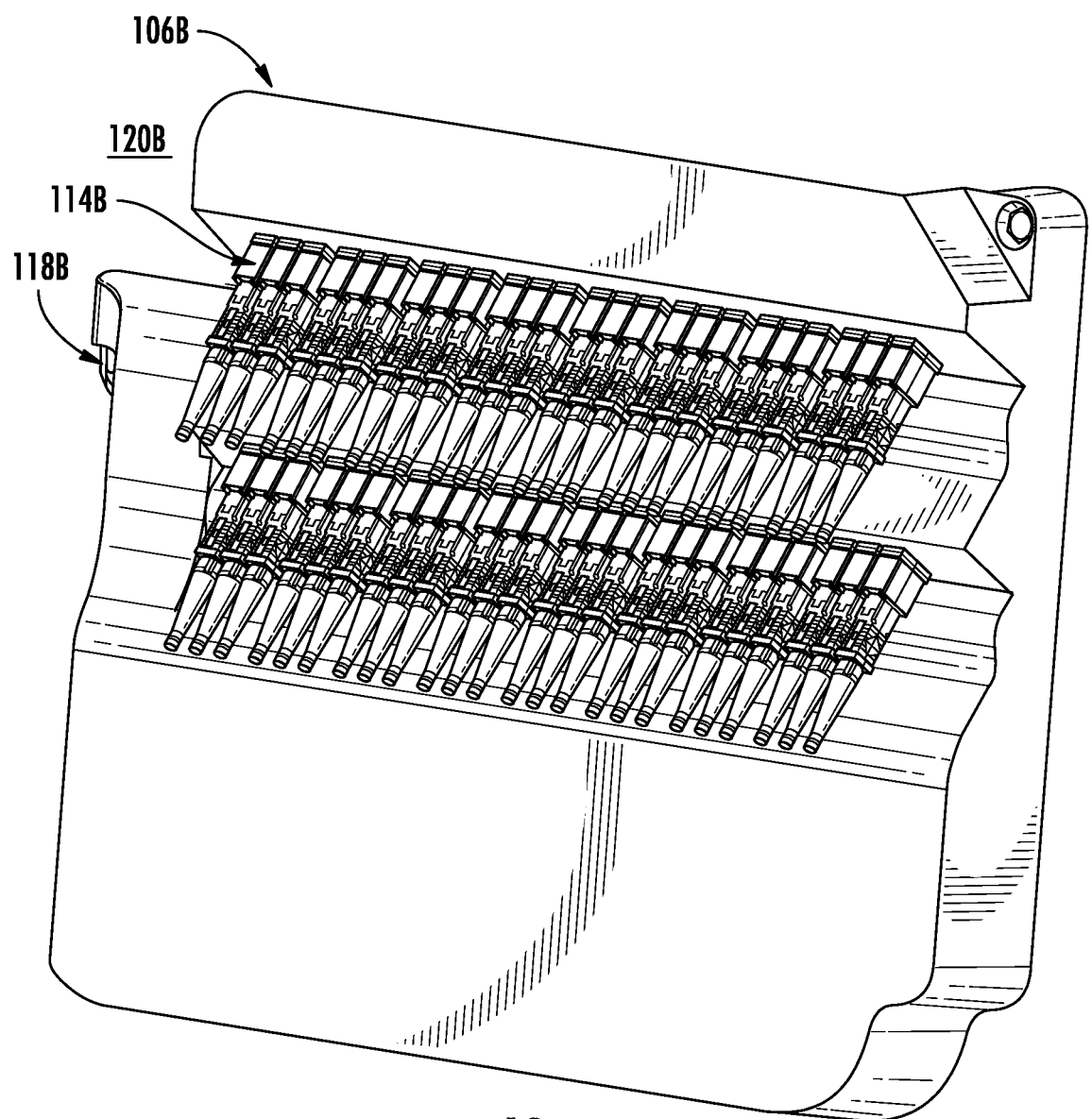
FIG. 12 illustrates a front perspective view of midplane of FIG. 10 according to an example embodiment.

FIG. 10 illustrates a rear view of another example midplane 106B. The midplane 106B includes two midplane covers 148B configured to cover the adapters, splice area, and slack storage areas. FIG. 11 depicts the midplane 106B of FIG. 10 with the midplane covers 148B removed to show internal features. In this embodiment, the midplane 106B includes 48 SC adapters. The slack storage features 146 are more complicated, e.g. include more fiber routing paths, to support the increased number of input cables and/or output cables. In some example embodiments, the midplane covers 148B may include additional slack storage features, splice holders, or the like. FIG. 12 illustrates a front perspective view of the midplane 106B. The notch 120B is disposed above the midplane hinges 118B. The midplane 106B may support a portion of the weight of the subscriber cables 163 and prevent axial torsion of the adapters 114B. In some embodiments, the notch 120B may be rounded to prevent damage to the subscriber cables. In an example embodiment, the diameter of the rounded portion of the notch 120B may be larger than the minimum bend radius of the subscriber cable.

Figure 13:
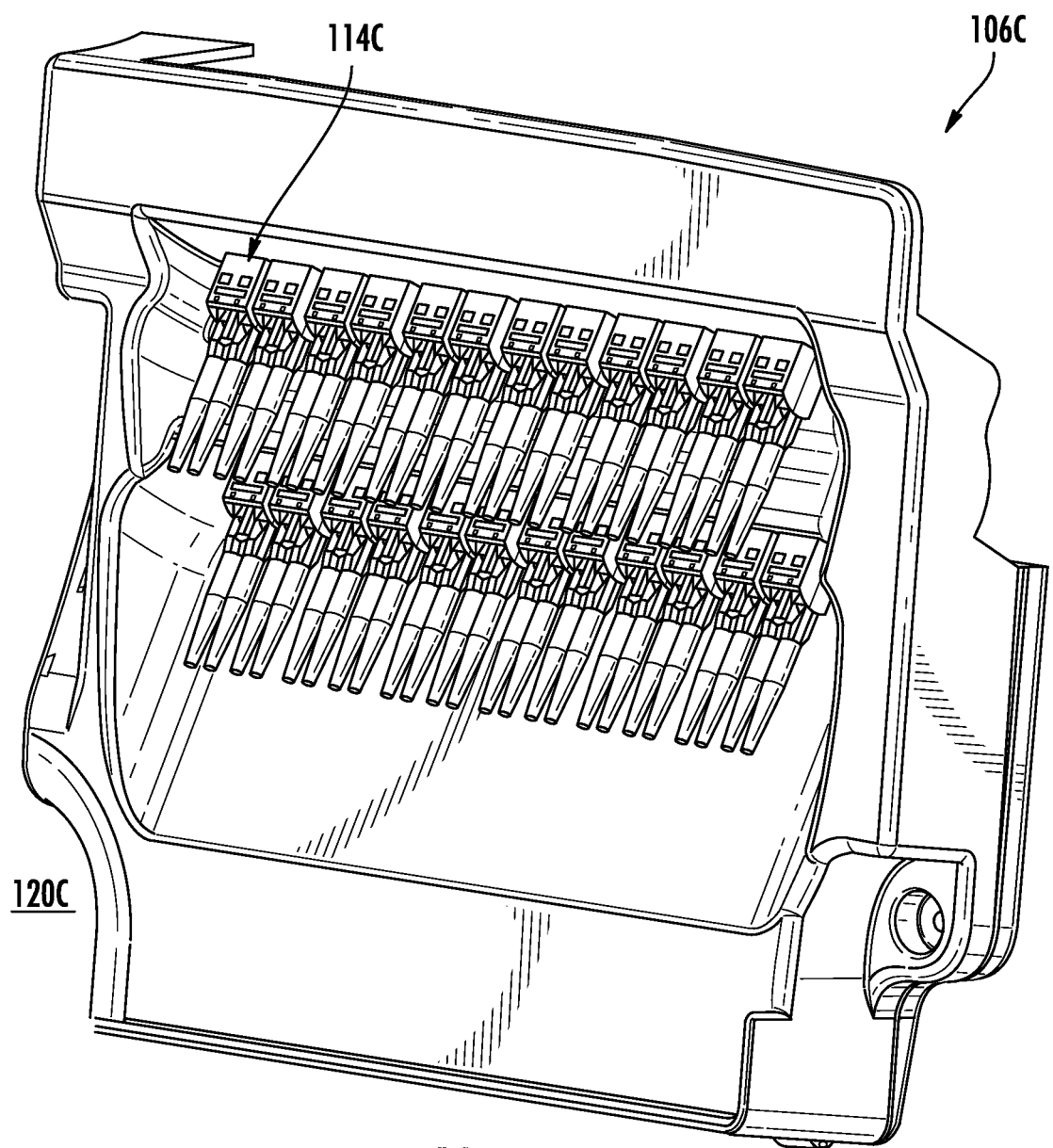
FIG. 13 illustrates a front perspective view of an example midplane with further increased patch panel capacity according to an example embodiment.
Figure 14:
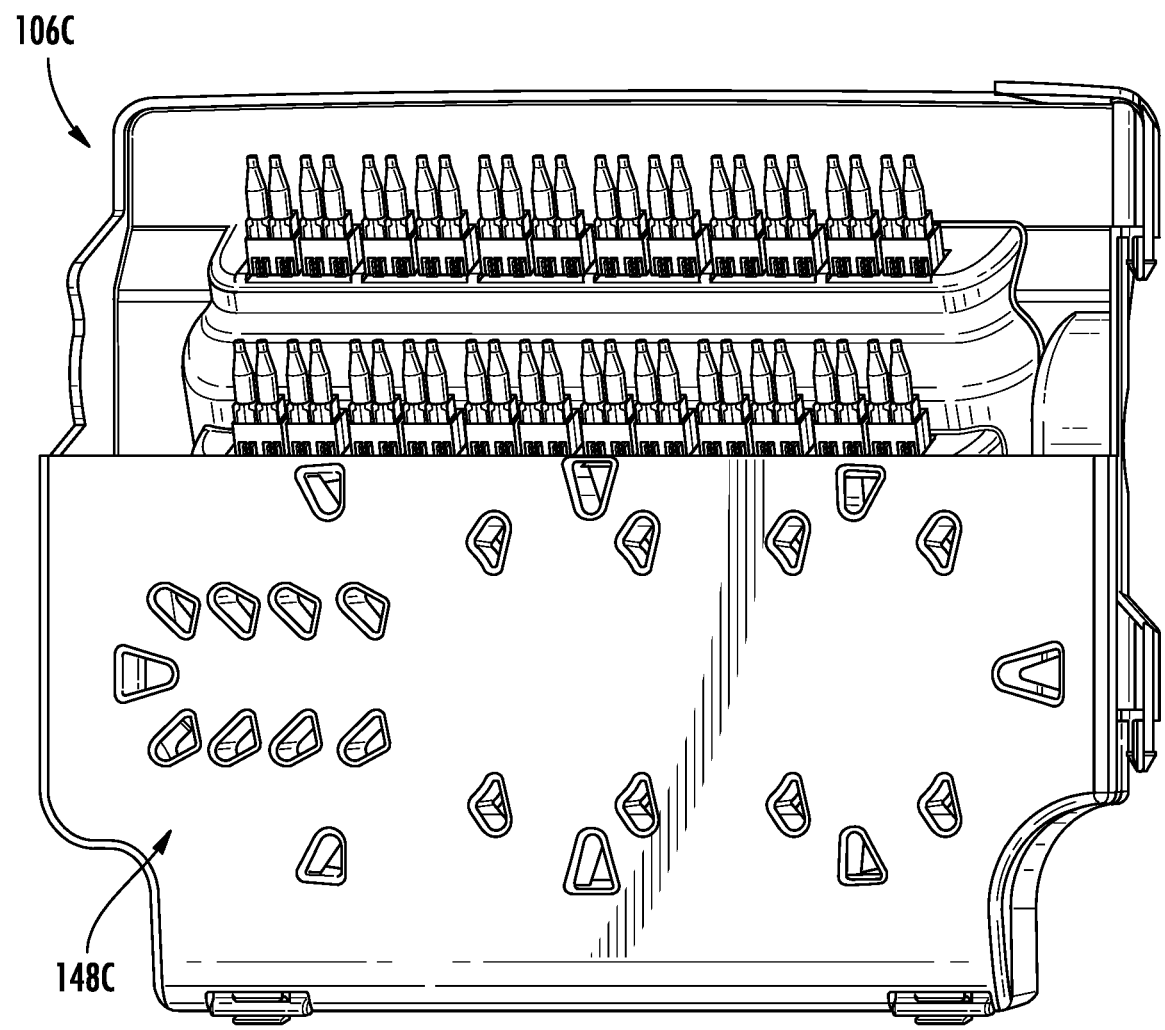
FIG. 14 illustrates a rear view of a the midplane of FIG. 13 according to an example embodiment.
Figure 15:
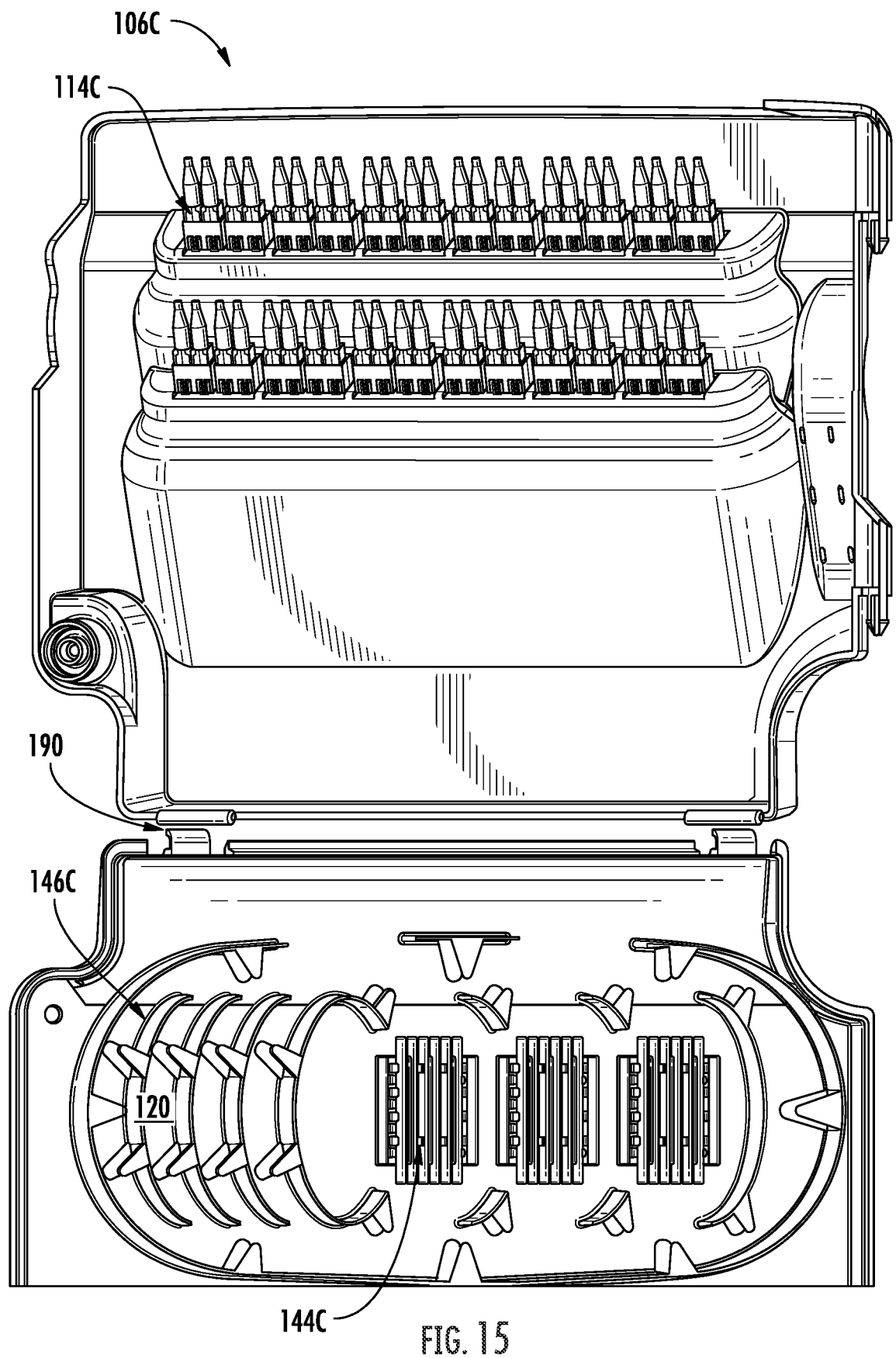
FIG. 15 illustrate a rear view of a the midplane of FIG. 13 with the midplane cover open according to an example embodiment.

FIG. 13 illustrates a front perspective view of yet a further example midplane 106C. The midplane 106C includes 24 duplex LC adapters 114. FIG. 14 illustrates a rear view of the midplane 106C with the midplane cover 148C installed. FIG. 15 illustrates the midplane 106C with the midplane cover 148C open. The midplane cover 148C may be couple to the midplane by a cover hinge 190. The cover hinge may enable the cover to transition between a shut position covering at least a portion of the adapters 114C, slack storage features 146C, and/or splice holders 144C and an open position enabling access to the same. The cover hinge 190 may include a bar and snap on hinge, enabling the midplane cover 148C to be selectively removed. In some example embodiments, the slack storage features 146C, and/or the splice holders 144C may be disposed on the midplane cover 148C.

In an example embodiment, a fiber optic assembly is provided including a base configured to be mounted to a surface, a sidewall extending from the base, a cover configured to engage the sidewall to enclose a portion of the fiber optic assembly, a midplane having a first surface and a second surface. The midplane separates a first portion of the fiber optic assembly from a second portion of the fiber optic assembly. The midplane includes a plurality of adapters disposed through the midplane from the first side to the second side, and a plurality of splice holders disposed on the second side configured to retain at least one fiber optic splice connection between an optical fiber of an input cable and an adapter of the plurality of adapters.

In some example embodiments, the fiber optic assembly also includes a hinge disposed between the midplane and the sidewall. The hinge enables the midplane to transition between an open position and a closed position. In an example embodiment, the hinge is disposed at a midplane edge, and the midplane includes a notch disposed at the midplane edge configured to enable routing of at least one optical fiber from the first portion of the fiber optic assembly to the second portion of the fiber optic assembly. In some example embodiments, the midplane also includes a latch configured to resist movement of the of the midplane from the closed position to the open position. In an example embodiment, the latch includes a quarter turn latch configured to transition between a locked position and an unlocked position. In some example embodiments, the midplane also includes a slack storage feature disposed on the second surface. In an example embodiment, the midplane also includes a midplane cover configured to at least partially enclose a portion of the second surface. In some example embodiments, the midplane cover at least partially encloses the plurality of adapters. In an example embodiment, the midplane cover at least partially encloses the plurality of splice holders. In some example embodiments, the cover includes a splitter retention feature. In an example embodiment, the midplane also includes a splitter retention feature. In some example embodiments, the splitter retention feature is disposed on the second surface. In an example embodiment, the fiber optic assembly also includes a plurality of cable retention features disposed at the sidewall and configured to route the input cable from a cable port to the midplane. In some example embodiments, the fiber optic assembly also includes at least one subscriber splice tray configured to retain a splice connection between the plurality of adapters and an output optical fiber. In an example embodiment, the at least one subscriber splice tray comprises a slack storage feature. In some example embodiments, a sealing element is disposed between the sidewall and the cover. In an example embodiment, the fiber optic assembly also includes at least one cable port disposed in the sidewall.

In a further example embodiment, a fiber optic assembly is provided including a base configured to be mounted to a surface, a sidewall extending from the base, a cover configured to engage the sidewall to enclose a portion of the fiber optic assembly, and a midplane having a first surface and a second surface. The midplane separates a first portion of the fiber optic assembly from a second portion of the fiber optic assembly and includes a plurality of adapters disposed through the midplane from the first side to the second side; and a plurality of splice holders disposed on the second side configured to retain at least one fiber optic splice connection between an optical fiber of an input cable and an adapter of the plurality of adapters. The fiber optic assembly also includes a hinge disposed between the midplane and the sidewall. The hinge enables the midplane to transition between an open position and a closed position.

In still a another embodiment, a fiber optic assembly is provided including a base configured to be mounted to a surface, a sidewall extending from the base, a cover configured to engage the sidewall to enclose a portion of the fiber optic assembly, and a midplane having a first surface and a second surface. The midplane separates a first portion of the fiber optic assembly from a second portion of the fiber optic assembly and includes a plurality of adapters disposed through the midplane from the first side to the second side and breakout cable disposed on the second side configured to optically connect a multifiber connector of an input cable and an adapter of the plurality of adapters. The fiber optic assembly also includes a hinge disposed between the midplane and the sidewall. The hinge enables the midplane to transition between an open position and a closed position.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A fiber optic assembly comprising:
   a base configured to be mounted to a surface;
   a sidewall extending from the base;
   a cover configured to engage the sidewall to enclose a portion of the fiber optic assembly;
   a midplane having a first surface and a second surface, wherein the midplane separates a first portion of the fiber optic assembly from a second portion of the fiber optic assembly;
   wherein the midplane comprises:
      a plurality of adapters disposed through the midplane from the first surface to the second surface; and
      a plurality of splice holders disposed on the second surface configured to retain at least one fiber optic splice connection between an optical fiber of an input cable and an adapter of the plurality of adapters; and
      a breakout cable disposed on the second surface configured to optically connect a multi-fiber connector of an input cable and an adapter of the plurality of adapters; and
   a hinge disposed between the midplane and the sidewall, wherein the hinge enables the midplane to transition between an open position and a closed position.

2. The fiber optic assembly of claim 1, wherein the midplane further comprises a splitter retention feature.

3. The fiber optic assembly of claim 1, further comprising a hinge stop including a detent and a bump projection, wherein the bump projection drops into the detent to resist rotation of the hinge.

4. A fiber optic assembly comprising:
   a base configured to be mounted to a surface;
   a sidewall extending from the base;
   a cover configured to engage the sidewall to enclose a portion of the fiber optic assembly; and
   a midplane having a first surface and a second surface, wherein the midplane separates a first portion of the fiber optic assembly from a second portion of the fiber optic assembly;
   wherein the midplane comprises:
      a plurality of adapters disposed through the midplane from the first surface to the second surface; and
      a plurality of splice holders disposed on the second surface configured to retain at least one fiber optic splice connection between an optical fiber of an input cable and an adapter of the plurality of adapters; and
      a breakout cable disposed on the second surface configured to optically connect a multi-fiber connector of an input cable and an adapter of the plurality of adapters.

5. The fiber optic assembly of claim 4 further comprising:
   a hinge disposed between the midplane and the sidewall, wherein the hinge enables the midplane to transition between an open position and a closed position.

6. The fiber optic assembly of claim 5, wherein the hinge is disposed at a midplane edge, and wherein the midplane comprises a notch disposed at the midplane edge configured to enable routing of at least one optical fiber from the first portion of the fiber optic assembly to the second portion of the fiber optic assembly.

7. The fiber optic assembly of claim 5, wherein the midplane further comprises a latch configured to resist movement of the of the midplane from the closed position to the open position.

8. The fiber optic assembly of claim 7, wherein the latch comprises a quarter turn latch configured to transition between a locked position and an unlocked position.

9. The fiber optic assembly of claim 4, wherein the midplane further comprises a slack storage feature disposed on the second surface.

10. The fiber optic assembly of claim 4, wherein the midplane further comprises a midplane cover configured to at least partially enclose a portion of the second surface.

11. The fiber optic assembly of claim 10, wherein the midplane cover at least partially encloses the plurality of adapters.

12. The fiber optic assembly of claim 10, wherein the midplane cover at least partially encloses the plurality of splice holders.

13. The fiber optic assembly of claim 12, wherein the cover comprises a splitter retention feature.

14. The fiber optic assembly of claim 4, wherein the midplane further comprises a splitter retention feature.

15. The fiber optic assembly of claim 14, wherein the splitter retention feature is disposed on the second surface.

16. The fiber optic assembly of claim 4 further comprising:
   a plurality of cable retention features disposed at the sidewall and configured to route the input cable from a cable port to the midplane.

17. The fiber optic assembly of claim 4 further comprising:
   at least one subscriber splice tray configured to retain a splice connection between the plurality of adapters and an output optical cable.

18. The fiber optic assembly of claim 17, wherein the at least one subscriber splice tray comprises a slack storage feature.

19. The fiber optic assembly of claim 4, wherein a sealing element is disposed between the sidewall and the cover.

20. The fiber optic assembly of claim 4 further comprising:
   at least one cable port disposed in the sidewall.

* * * * *